United States Patent
Daimon et al.

(10) Patent No.: US 7,625,660 B2
(45) Date of Patent: Dec. 1, 2009

(54) FUEL CELL AND MEMBRANE ELECTRODE ASSEMBLY

(75) Inventors: Hideo Daimon, Ibaraki (JP); Yukiko Yamamoto, Ibaraki (JP); Kohei Ugawa, Ibaraki (JP); Masaki Sekine, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 323 days.

(21) Appl. No.: 11/384,398

(22) Filed: Mar. 21, 2006

(65) Prior Publication Data
US 2006/0228603 A1  Oct. 12, 2006

Related U.S. Application Data

(63) Continuation-in-part of application No. 11/268,503, filed on Nov. 8, 2005, and a continuation-in-part of application No. 11/017,825, filed on Dec. 22, 2004, now Pat. No. 7,192,670.

(30) Foreign Application Priority Data

| Dec. 26, 2003 | (JP) | ............... 2003-433758 |
| Jul. 13, 2004 | (JP) | ............... 2004-206232 |
| Nov. 9, 2004 | (JP) | ............... 2004-325629 |
| Mar. 22, 2005 | (JP) | ............... 2005-081229 |

(51) Int. Cl.
*H01M 4/00* (2006.01)
(52) U.S. Cl. .................... 429/40; 429/27; 429/42
(58) Field of Classification Search .......... 429/40, 429/231.4, 27, 42
See application file for complete search history.

(56) References Cited

U.S. PATENT DOCUMENTS

| 4,359,406 | A * | 11/1982 | Fung ..................... 502/200 |
| 5,906,716 | A * | 5/1999 | Mertesdorf et al. ......... 204/296 |
| 2004/0197638 | A1 * | 10/2004 | McElrath et al. ............ 429/44 |
| 2005/0009696 | A1 * | 1/2005 | Mao et al. .................. 502/325 |
| 2005/0142428 | A1 | 6/2005 | Daimon |

FOREIGN PATENT DOCUMENTS

| JP | 56-155645 A | 12/1981 |
| JP | 57-5266 A | 1/1982 |
| JP | 2-111440 A | 4/1990 |
| JP | 09-239278 | 9/1997 |
| JP | 10-092441 | 4/1998 |
| JP | 2004-079438 | 3/2004 |

OTHER PUBLICATIONS

M. Uchida et al., J. Electrochem. Soc. vol. 143, No. 7, Jul. 1996, pp. 2245-2252.
M Uchida et al., J. Electrochem. Soc., vol. 142, No. 8, Aug. 1995, pp. 2572-2576.
"A New Catalyst for Fuel Cell Reduction of PtRu Catalyst Size to 2nm by Addition of Phosphorus", News Release of Hitachi Maxell, Ltd., Mar. 29, 2005, http://www.maxell.co.jp/e/release/20050329.html., two pages.

* cited by examiner

*Primary Examiner*—Patrick Ryan
*Assistant Examiner*—Ben Lewis
(74) *Attorney, Agent, or Firm*—Birch, Stewart, Kolasch & Birch, LLP

(57) ABSTRACT

A fuel cell has an anode, a cathode, and a polymer electrolyte membrane placed between the anode and the cathode. The anode includes a catalyst which is composed of binary or ternary particulates deposited on a carbon support. The particulate is represented by a general formula: Pt—P, wherein Ru is optionally present. The content of P is in a range of 2 mol % to 50 mol % based on the total moles of Pt or Pt—Ru. The diameter of the catalyst particulates is in range from 1 to 3 nm.

22 Claims, 7 Drawing Sheets

FUEL CELL AND MEMBRANE ELECTRODE ASSEMBLY

CROSS-REFERENCE TO RELATED APPLICATIONS

The present invention is a Continuation-in-Part (CIP) application of commonly-assigned, co-pending, U.S. patent application Ser. No. 11/017,825 filed Dec. 22, 2004 and Ser. No. 11/268,503 filed Nov. 8, 2005 which are both hereby incorporated by reference in their entirety.

BACKGROUND OF THE INVENTION

1. Field of the Invention

The present invention relates to fuel cells and membrane electrode assemblies having a new catalyst at an electrode. More specifically, the present invention relates to fuel cells and membrane electrode assemblies comprising a platinum and phosphorus catalyst at either a fuel electrode/anode or cathode.

2. Description of Related Art

For the most part, electric energy has been supplied by thermal power generation, water power generation, and nuclear electric power generation. However, thermal power generation burns fossil fuels such as oil and coal and it causes not only extensive environmental pollution but also a depletion of energy resources such as oil. The use of water power generation requires large-scale dam construction so that the number of sites for proper construction are limited. Also, the building of the dam and the change in water coverage of the land can cause destruction of nature. Further, the nuclear electric power generation has problems including the fact that radioactive contamination is possible in the event of an accident which can be fatal and decommissioning of nuclear reactor facility is difficult. These problems have resulted in the decrease of nuclear reactor construction on a global basis.

As a power generation system which does not require a large-scale facility nor causes environmental pollution, wind power generation and solar photovoltaic power generation have come into use around the world. Wind power generation and solar photovoltaic power generation have come into practical use in some places. However, wind power generation cannot generate power with no wind and the solar photovoltaic power generation cannot generate power with no sunlight. The two systems are dependent on natural phenomena, and thus, are incapable of providing a stable power supply. Further, the wind power generation has a problem that the frequency of generated power varies with the intensity of wind, causing breakdown of the electrical equipment.

Recently, a power plant that draws electrical energy from hydrogen energy, such as hydrogen fuel cells, has been under active development. The hydrogen is obtained by splitting water and exists inexhaustibly on the earth. In addition, the hydrogen has a large chemical energy amount per unit mass, and it does not generate hazardous substances and global warming gases when used as an energy source.

A fuel cell which uses methanol instead of hydrogen has also been studied actively. A methanol fuel cell directly uses methanol, which is a liquid fuel, is easy to use and is low in cost. Thus, the methanol fuel cell is expected to be used as a relatively small output power source for household or industrial use. A theoretical output voltage of a methanol/oxygen fuel cell is 1.2 V (25° C.), which is almost the same as that of the hydrogen fuel cell. Thus, they could have the same end uses in principle.

A solid-polyelectrolyte fuel cell and a direct methanol fuel cell oxidize hydrogen or methanol at the anode and reduce oxygen at the cathode, thereby drawing electric energy. Since the oxidation-reduction reaction has a high thermodynamic barrier making it difficult to achieve at room temperature, a catalyst is used in the fuel cells. Initial fuel cells use platinum (Pt) as a catalyst, depositing it on a carbon support. The Pt has catalytic activity for oxidation of hydrogen and methanol. A conventional approach for minimizing Pt catalyst particles to increase a reactive surface area is to control the deposition atmosphere of the Pt catalyst by adjusting external factors in the deposition process. For example, Japanese Unexamined Patent Application Publication No. 56-155645 introduces a technique that, when reducing Pt ion by adding alcohol and depositing it on a carbon support, adds polyvinyl alcohol into a reaction solvent. The polyvinyl alcohol serves as an organic protective agent, which absorbs weakly onto the surface of the Pt catalyst particles, thereby forming fine Pt catalyst particulates. However, since the organic protective agent absorbs onto the surface of the Pt catalyst in this technique, it is necessary to remove the organic protective agent from the surface of the Pt catalyst to show its catalytic activity. The heat treatment at 400° C. in the atmosphere of hydrogen gas, which follows the generation of the Pt particulates, is proposed to remove the organic protective agent. However, this treatment cannot completely remove the organic protective agent from the Pt catalyst surface. This inhibits the Pt catalyst activity. Further, the heat treatment at 400° C. can cause sintering of the Pt particulates, which results in an increase in the catalyst particle size and a decrease in the catalytic activity.

Furthermore, it is possible for chemisorption to occur of carbon monoxide (CO) generated during the methanol oxidation process or contained in the hydrogen gas onto the Pt catalyst at the anode, which results in deactivation of catalytic activity. This is referred to as catalyst poisoning by CO. In order to suppress the Pt catalyst poisoning by CO, an additive element into the Pt has been searched, and it was found that adding Ru to Pt significantly reduces the catalyst poisoning by CO (see Japanese Unexamined Patent Application Publication No. 57-5266, for example) at the anode.

Though the Ru itself does not oxidize hydrogen and methanol, it serves as a promoter that quickly oxidizes CO deposited on Pt into $CO_2$ and releases it. In the case of a direct methanol fuel cell, for example, a deprotonation reaction occurs on the Pt catalyst particles and CO chemically adsorbs onto the Pt catalyst particles, as indicated by the following reaction formula (1). This is the catalyst poisoning by CO. However, with the use of a Pt—Ru catalyst containing Ru, the Ru reacts with water to generate Ru—OH as indicated by the following reaction formula (2). Then, the CO, which chemically absorbs onto the Pt catalyst particle surface, is oxidized into $CO_2$ and removed, as indicated by the following reaction formula (3):

  (1)

  (2)

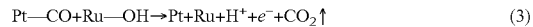  (3)

If the Pt—Ru catalyst is synthesized by impregnation, electroless plating, or alcohol reduction, the particle size falls in the range of 5 to 10 nm. If the Pt—Ru particle size remains large, the effective catalyst surface area does not increase and the catalytic activity stays unimproved. In order to enhance the catalytic activity of the Pt—Ru, it is effective to reduce the Pt—Ru particle size to below 5 nm and increase the effective catalyst surface area. In this case, the technique of adding the organic protective agent to reduce the Pt—Ru catalyst particle size is not available for the above reasons. A new effective technique to produce a Pt—Ru catalyst for the anode of less than 5 nm has thus been strongly required, but it remains unachieved.

Similarly, a Pt catalyst is used at the cathode of fuel cell. At the cathode, the oxygen is reduced by electrons which are generated at anode and reacts with protons which come from anode, which generates water by the following reaction formula (4).

$$O_2 + 4e^- + 4H^+ \rightarrow 2H_2O \quad (4)$$

In order to enhance the catalytic activity of the Pt, it is also effective to reduce the Pt particle size to below 5 nm and increase the effective catalyst surface area. In this case, the technique of adding the organic protective agent to reduce the Pt catalyst particle size is not available for the above reasons. A new effective technique to produce a Pt catalyst for the cathode less than 5 nm has thus been strongly required, but it remains unachieved.

SUMMARY OF THE INVENTION

In view of the foregoing, it is an object of the present invention to provide a fuel cell and a membrane electrode assembly which have a new Pt catalyst system with an average particle diameter of less than 5 nm for use in the anode (fuel electrode) and/or cathode (oxygen electrode). Preferably, average particle diameter is in a range of 1 nm to 3 nm.

In an embodiment of the invention, the catalyst particles comprise Pt and least 2 atom % P. Preferably, the content of P is 2 atom % to 50 atom %. More preferably, the content of P is 20 atom % to 35 atom %.

In another embodiment of the invention, the particles have a narrow size distribution wherein the particles have an average particle size of less than ±15% of the mean average particle size.

In another embodiment of the invention, the heterogeneous catalyst further comprises a carbon support.

The carbon support is can be any type known in the art, but is preferably at least one selected from the group consisting of carbon black (e.g., acetylene black) and carbon nanotube (e.g., multi-walled carbon nanotube). Preferably, the carbon support has a specific surface in a range of 20 m$^2$/g to 300 m$^2$/g. More preferably, the carbon support has a specific surface in a range of 20 m$^2$/g to 60 m$^2$/g.

According to one aspect of the present invention, there is provided a fuel cell which includes a fuel electrode, an oxygen electrode, and a polymer electrolyte membrane which is placed between the fuel electrode and the oxygen electrode. The fuel electrode and the oxygen electrode include the above-described heterogeneous Pt catalyst system having an average particle diameter of less than 5 nm. At the fuel electrode, the catalyst is preferably a ternary particulate which is deposited on a carbon support, wherein the ternary particulate is represented by a general formula: Pt—Ru—P. Whereas at the oxygen electrode, the heterogeneous catalyst is a binary particulate which is deposited on a carbon support, the binary particulate being represented by a general formula: Pt—P.

In an embodiment of the invention, the ternary particulate comprises up to 60 atom % Ru. Preferably, the ratio of Pt and Ru in the particles is Pt$_{40}$Ru$_{60}$ to Pt$_{90}$Ru$_{10}$. More preferably, the particles comprise at least 60 atom % Pt. Most preferably, the content of P is in a range of less than 50 atom %.

In an embodiment of the invention, the new Pt system catalyst with an average particle diameter of less than 5 nm is used in a fuel cell or a membrane electrode assembly and is made in a process comprising a step of reducing Pt ions in the presence of a reducing agent comprising phosphorus. Preferably, the reducing agent is a compound comprising phosphorus which is at least one of derivatives of phosphinic acid or phosphonic acid (including alkali and ammonium salts).

When the catalyst is to be used at the anode, the process further comprises reducing Ru ions with the reducing agent.

In an embodiment of the invention, the process for preparing the heterogeneous catalyst comprises a step of reducing the Pt ions and Ru ions with the reducing agent.

In an embodiment of the invention, the reducing step is an alcohol reduction step or electroless plating step. However, it is also envisioned that the reducing step can be an electrolysis step.

An embodiment of the invention is a method of producing a voltage with the fuel cell comprising the inventive Pt system catalyst having an average particle diameter of less than 5 nm, wherein said method comprises feeding methanol and water to the anode and feeding oxygen to the cathode.

An embodiment of the invention is a membrane electrode assembly, comprising a fuel electrode catalyst layer, an oxygen electrode catalyst layer and a polymer electrolyte membrane placed between the fuel electrode catalyst layer and the oxygen electrode catalyst layer wherein said fuel electrode catalyst layer and/or oxygen electrode catalyst layer comprise the inventive Pt system catalyst having an average particle diameter of less than 5 nm. The present invention adds P-atoms to a Pt catalyst which may further contain Ru to form a binary or ternary catalyst when depositing the Pt or Pt—Ru particulates on a carbon support by electroless plating or alcohol reduction. This miniaturizes the catalyst deposited on the carbon support by the action of P from outside and inside the particle, which increases the surface area of the catalyst, thereby improving catalytic activity, and when present, maintaining the effect of adding Ru. Further, the present inventors have found that, though NAFION® membrane, available from E.I. DuPont de Nemours and Company, is generally used as a polymer electrolyte membrane between the anode and cathode of the fuel cell, the use of the NAFION® membrane causes a hydrogen atom of a sulfonic group to turn into H$^+$ to exert proton conductivity. This makes the boundary between the NAFION® membrane and the electrode catalyst strongly acidic. While metallic elements from group III such as Mo, Mn, Fe, and Co are not acid-resistant and subject to transformation with H$^+$, P is different from other metallic elements from group III elements and is acid-resistant, thus being suitable for use as an additional element to a catalyst for a fuel cell.

The present invention have found that adding P to produce Pt—P catalyst when depositing Pt catalyst on a carbon support by electroless plating, alcohol reduction, or ultrasonic reduction miniaturizes Pt catalyst particles that are deposited on the carbon support by the action of P from the inside and outside of the Pt catalyst particles, which increases the specific surface area of the catalyst particles, thereby improving catalytic activity.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
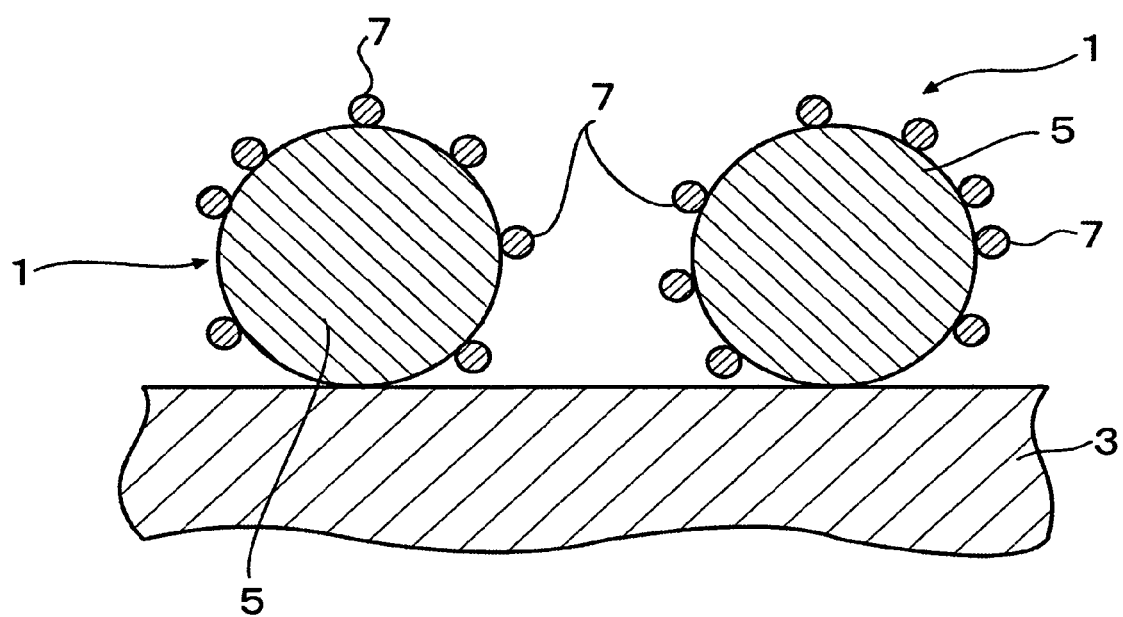
FIG. 1 is a schematic sectional view of a Pt—Ru—P catalyst particulate synthesized by an alcohol reduction method according to the present invention.

A catalyst for a fuel cell of the present invention includes a particulate for an anode or cathode comprising platinum and phosphorus which are deposited on a carbon support. When the particulate is used at the anode, it preferably further includes ruthenium.

In the above formula, a content of P is preferably 2 to 50 mol % of the total moles of Pt—Ru. If the content of P is less than 2 mol %, it fails in attaining expected effects. If, on the other hand, the content of P is more than 50 mol %, the content of Pt—Ru is too small, causing adverse effects on cell outputs. More preferably, the content of P is 5 to 30 mol %.

An atomic ratio (at. %) of Pt and Ru in the above ternary catalyst is preferably in the range of 40:60 to 90:10. If Ru is less than 10 at %, it causes disadvantages such as insufficient prevention of CO poisoning. If, on the other hand, Pt is less than 40 at %, it causes insufficient catalytic activity for methanol oxidation.

Setting the atomic composition of Pt—Ru to $Pt_{40}$—$Ru_{60}$ to $Pt_{90}$—$Ru_{10}$ allows the composition of the outermost surface of the catalyst to be optimized so as to enhance the catalytic activity. Further, setting the P composition to 2 to 50 mol % of the total moles of Pt—Ru allows suppressing the particle growth of the Pt or Pt—Ru catalyst so as to produce a catalyst with a large specific surface. In this condition, the reactions of the formulas (2) and (3) proceed more rapidly, thereby improving oxidation activity of methanol.

The average particle size of the Pt—P and Pt—Ru—P catalysts is preferably 1 to 3 nm. If the particle size is less than 1 nm, the activity on a synthesized catalyst surface is too high, and the catalyst forms a chemical compound on its surface layer together with a substance existing in the vicinity, thus decreasing its own activity. If, on the other hand, the particle size is more than 3 nm, it is impossible to sufficiently increase the catalyst surface area per unit weight, thus failing to enhance the catalytic activity.

The specific surface area of the carbon support which serves as a carrier of the catalyst is preferably 20 to 300 $m^2/g$. If the specific surface area is less than 20 $m^2/g$, the carbon support cannot support the catalyst sufficiently. If, on the other hand, it is more than 300 $m^2/g$, the number of pores existing in the carbon support is too large and the size of the pores is too small, which increases the number of catalyst particles to be buried in the pores. The catalysts buried in the pores hardly create proper three-phase interfaces (where the metal atoms are in contact with both the fuel and NAFION®) in the cell reaction and cease to function as a catalyst. In addition, as the specific surface area of the carbon support increases, bulk density (in the unit of gram/1000 ml) tends to increase. If a catalyst having the same loading rate (for example, 50 wt %) is deposited on a different carbon support with different bulk density, the thickness of an electrode changes in spite of the same catalyst application quantity (for example, 5 $mg/cm^2$). Use of a catalyst with a larger bulk density results in a thinner electrode. This decreases permeability of fuel at fuel electrode and volatility of water at the oxygen electrode due to the lack of physical apertures in the electrodes, deteriorating the cell characteristics. Hence, it is preferred to use a carbon support with a possibly lowest bulk density or smallest specific surface for the carbon support of a fuel cell. The carbon support available in the present invention is at least one of carbon black such as acetylene black, carbon nanotube, or the like. The carbon nanotube can be single or multi-walled. Preferably, when the carbon support comprises carbon nanotubes, the carbon nanotubes are multi-walled carbon nanotubes. The carbon support may be used independently or in combination.

The Pt—Ru—P catalyst of the present invention is particularly suitable for use as a catalyst of a fuel electrode such as a methanol electrode of a direct methanol fuel cell (DMFC) and a hydrogen electrode of a polymer electrolyte fuel cell (PEFC).

The Pt—Ru—P catalyst particulates of the present invention may be produced by electroless plating method or alcohol reduction method.

A method of producing the Pt—Ru—P catalyst particulates of this invention by the alcohol reduction basically comprises (1) a step of dispersing a carbon support into an organic solvent comprising of one or more types of alcohol, (2) a step of dissolving Pt salt or complex, Ru salt or complex, and P-containing compound into the alcohol organic solvent with the dispersed carbon support, (3) a step of adjusting the pH value of the alcohol solvent with dispersed carbon powder to fall in appropriate value, (4) a step of performing heat reflux with alcohol in inert atmosphere, and optionally (5) a step of washing with an alcohol. The catalyst for a fuel cell with the ternary particulates represented by the general formula Pt—Ru—P deposited on the carbon support is thereby generated.

The method of producing the Pt—P catalyst particulates of this invention by the alcohol reduction, proceeds essentially the same as the method of producing the Pt—Ru—P catalyst except that the ruthenium salt or complex is not used.

A method of producing the Pt—Ru—P catalyst particulates of this invention by the electroless plating basically comprises (1) a step of dispersing a carbon support into a water, (2) a step of dissolving Pt salt or complex, Ru salt or complex, and P-containing compound into the water with the dispersed carbon support, (3) a step of adjusting the pH value of the water with dispersed carbon powder to fall in appropriate value, and (4) a step of performing electroless plating in the atmosphere or inert atmosphere. The catalyst for a fuel cell with the ternary particulates represented by the general formula Pt—Ru—P deposited on the carbon support is thereby generated.

The method of producing the Pt—P catalyst particulates of this invention by the electroless plating, proceeds essentially the same as the method of producing the Pt—Ru—P catalyst except that the ruthenium salt or complex is not used.

A method of producing the PtP catalyst of this invention by ultrasonic reduction basically includes: (1) a step of dispersing a carbon support having a specific surface area of 20 m²/g to 300 m²/g into pure water, (2) a step of dissolving Pt salt or complex and P-containing compound into the solution containing the dispersed carbon support, (3) a step of adjusting the pH value of the solution containing the dispersed carbon support, the Pt salt or complex and the P-containing compound to the alkali side, and (4) a step of applying ultrasonic wave to the solution in the air or inert atmosphere. This process produces oxygen electrode catalyst for fuel cell where catalyst that is represented by the general formula PtP is supported on the carbon support.

FIG. 1 is a schematic sectional view of the Pt—Ru—P catalyst particulate 1 of this invention obtained by the above alcohol reduction method. The P particle 7 is coordinated on the outer surface of the Pt—Ru particle 5 deposited on the carbon support 3. X-ray photoelectron spectroscopy shows that the P particle 7 exists as an oxide. It is assumed that the coordination of P particle 7 on the outer surface of the Pt—Ru particle 5 stops the growth of the Pt—Ru particle 5, thereby minimizing the overall size of the Pt—Ru—P catalyst particulate 1. (The present invention is not limited by this assumption however.)

Figure 2:
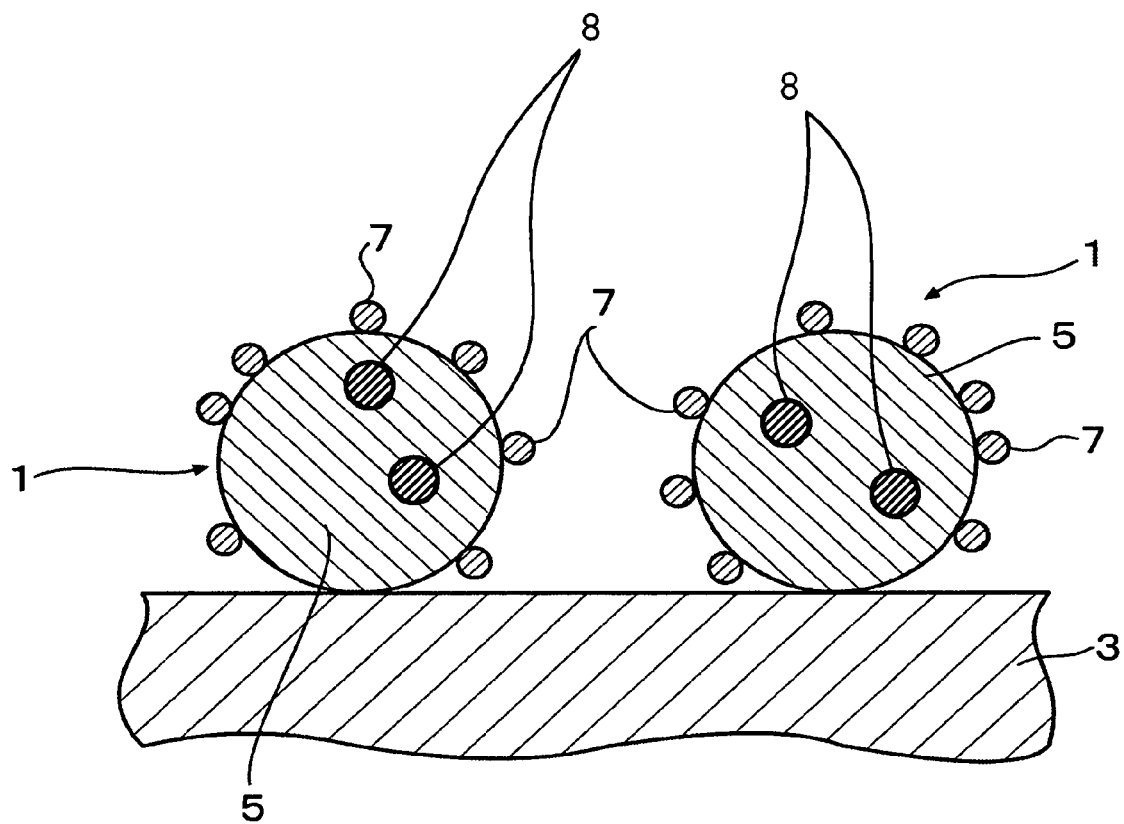
FIG. 2 is a schematic sectional view of a Pt—Ru—P catalyst particulate synthesized by an electroless plating method according to the present invention.

FIG. 2 is a schematic sectional view of the Pt—Ru—P catalyst particulate 1 of this invention obtained by the above electroless plating method. The P particle 7 is coordinated on the outer surface of the Pt—Ru particle 5 deposited on the carbon support 3. At the same time, P particles 8 are incorporated into Pt—Ru particle 5, producing metal phosphide which is suggested by X-ray photoelectron spectroscopy. It is assumed that the coordination of P particle 7 on the outer surface of the Pt—Ru particle 5 and incorporation of P particles 8 into Pt—Ru particle 5 stop the growth of the Pt—Ru particle 5, thereby minimizing the overall size of the Pt—Ru—P catalyst particulate 1. (The present invention is not limited by this assumption however.)

The size of the Pt—P or Pt—Ru—P catalyst particulate generated by the method of this invention is smaller than that of a conventional Pt or Pt—Ru catalyst particulate due to the presence of P. Though the particle size of Pt or Pt—Ru catalyst generated by a conventional production process is generally about 5 to 10 nm, the particle size of the Pt or Pt—Ru catalyst to which P is added according to the present invention is significantly decreased to 1 to 3 nm. The decrease in the particle size increases the surface area of the Pt—Ru catalyst, which significantly enhances hydrogen oxidation or methanol oxidation. Another advantage of the Pt—P or Pt—Ru—P catalyst particulate of the present invention is that the distribution range of the particle size is narrower than that of the conventional Pt or Pt—Ru catalyst particulates. The center of the particle size distribution range of the Pt or Pt—Ru catalyst produced by the conventional process is more than 5 nm, and further miniaturization of the particle has been difficult. The present invention overcomes this problem by adding P to the Pt or Pt—Ru catalyst to create the Pt—P binary or Pt—Ru—P ternary catalyst.

By adjusting the pH value of an alcohol solvent or water where a compound of platinum, optionally ruthenium, and phosphorus is dissolved to fall in appropriate value, the composition of the Pt and, if present, Ru on the Pt—P or Pt—Ru—P particulate surface is optimized. This allows the oxidation reaction of CO shown by the reaction formula (3) to proceed effectively to enhance the methanol oxidation activity.

An acid used for adjusting the pH value to acidic region is preferably an acid having a boiling point of 200° C. and above. This is because the heat refluxing of alcohol is performed at about 200° C. in some cases. The acid having the boiling point of less than 200° C. can be evaporated by the alcohol refluxing, making it difficult to maintain the pH value within a given range. Hence, hydrochloric acid and nitric acid, for example, are not suitable since they have a low boiling point and thus, are evaporated during the heat refluxing. A sulfuric acid having the boiling point of 290° C. is preferred for use in this invention.

Abase used for adjusting the pH value to basic region is preferably sodium hydroxide or potassium hydroxide for the same reason described above.

The P-containing compound available in the production process of the Pt—P or Pt—Ru—P catalyst particulate of the present invention includes phosphonic acid and phosphinic acid and derivatives of phosphonic acid and phosphinic acid, such as sodium phosphinate, ammonium phosphinate, disodium hydrogenphosphite, sodium dihydrogenphosphite. Since the pentavalent P-atom has the same electron configuration as Ne, it is chemically stable by the Octet Rule, which is not suitable for this invention. Thus, phosphoric acid having the pentavalent P-atom ($H_3PO_4$) is preferably not be used in this invention. The addition amount of the P-containing compound is preferably within the range of 5 to 50% of the total moles of Pt and, if present, Ru. If it is less than 5%, the effect of reducing the Pt or Pt—Ru catalyst particle size is not enough, and if it is more than 50%, the characteristics of the catalyst deteriorate. The P-containing compound may be used independently or in combination.

The Pt salt or complex used in this invention is, for example, platinum acetate, platinum nitrate, platinum dinitrodiamine complex, ethylenediamine platinum complex, triphenylphosphine platinum complex, platinum ammine complex, bis(acetylacetonato)platinum(II), hydrogen hexachloroplatinate. The platinum compound may be used independently or in combination.

The Ru salt or complex used in this invention is, for example, ruthenium (III)chloride n-hydrate, ruthenium acetate, ruthenium nitrate, ruthenium triphenylphosphine complex, ruthenium ammine complex, ruthenium ethylenediamine complex, tris(acetylacetonato)ruthenium (III). The ruthenium compound may be used independently or in combination.

In alcohol reduction, when compound for catalyst synthesis is dissolved into alcohol solution and reduced at a temperature close to a boiling point of the alcohol solution, alcohol (R—OH) discharges electrons during heat refluxing to reduce Pt ion. The alcohol itself is oxidized into aldehyde (R—CHO). In electroless plating, when hypophosphite ion is oxidized into phosphorous ion or phosphate ion for example, it discharges electrons and Pt ion receives the electron and is reduced to metal. In ultrasonic reduction, cavitation creates a high pressure and high temperature field to generate reducing chemical species, which reduces Pt ion.

The alcohol that may be used in the heat refluxing process of the present invention includes methyl alcohol, ethyl alcohol, ethylene glycol, glycerol, propylene glycol, isoamyl alcohol, n-amyl alcohol, sec-butyl alcohol, n-butyl alcohol, isobutyl alcohol, allylalcohol, n-propyl alcohol, 2-ethoxyalcohol, 1,2-hexadecanediol. One type or two or more types of alcohol may be selected to use. In order to prevent oxidation of particulates during reflux, it is preferred to perform reflux while displacing the gas in the reaction system with inert gas such as nitrogen and argon.

A heat temperature and a reflux time in the alcohol reduction process vary by the kind of alcohol in use. Generally, the heat temperature is about 60° C. to 300° C., and the reflux time is about 30 minutes to 6 hours. In the electroless plating process, a general bath temperature is about 50° C. to 90° C., and a plating time is about 30 minutes to 2 hours. In the ultrasonic reduction process, an ultrasonic wave application time is about 30 minutes to 4 hours.

In the present invention, the alcohol reduction process dissolves Pt salt or complex and P-containing compound into at least one kind of alcohol. The alcohol may or may not contain water. The electroless plating process and the ultrasonic reduction process dissolve Pt salt or complex and P-containing compound into pure water basically. The electroless plating process and the ultrasonic reduction process may add the above-described alcohol as reduction assistant.

The present invention dissolves the Pt and, if present, Ru salt or complex and the P-containing compound into an organic solvent composed of at least one type of alcohol. The alcohol may or may not contain water.

A loading rate of the catalyst used in this invention is suitably 30wt % or above. If it is less than 30 wt %, formation of a given amount of catalyst results in an increase in the thickness of a catalyst electrode. This increases diffusive resistance of oxygen fuel or generated water, which is not suitable. An upper limit of a loading rate is not specified. For example, in order to obtain a loading rate of 80wt %, a specific surface area of a support needs to be 200m$^2$/g or larger if a catalyst particle diameter is 2 nm. Obtaining catalyst with a high loading rate requires use of a porous carbon support. In such a case as well, it is needed to use a porous carbon support with the smallest possible number of fine pores. For example, Vulcan®-XC-72R with a specific surface of 254 m$^2$/g available from Cabot corporation Inc. may be used.

The loading rate of the catalyst used in this invention is preferably 50 to 70 wt %. If it is less than 50 wt %, the thickness of the catalyst electrode layer is too large and the diffusibility of the fuel decreases to deteriorate the cell characteristics. On the other hand, if it is more than 70 wt %, it is too difficult to load the catalyst particles on the carbon support while supporting the whole catalyst.

Though fuel electrode catalyst to be used in pair with the PtP oxygen electrode catalyst of the present invention may be the one that is used conventionally in direct methanol fuel cells and polymer electrolyte fuel cells, such as PtRu, it is preferred to use a PtRuP catalyst particle that is described in Japanese Patent Application No. 2003-433758, 2004-206232, 2004-271034 and 2004-373450, which are presented by the inventors of the present invention. As described in these, the inventors have already found that adding P reduces a particle diameter of PtRu catalyst. By adding P, the PtRu catalyst particle diameter is reduced to less than about 5 nm, preferably 1 to 3 nm, and more preferably about 2 nm. This increases the specific surface area of PtRuP catalyst, thereby enhancing the oxidation activity of methanol or hydrogen. Even when non-porous multiwalled carbon nanotube or acetylene black is used as a carbon support, the particle diameter of the PtRuP catalyst is kept to less than 5 nm. Thus, using the PtP oxygen electrode catalyst in combination with the PtRuP fuel electrode catalyst allows producing a fuel cell with significantly high cell characteristics.

EXAMPLE 1

Bis(acetylacetonato)platinum(II) of 1.69 mmol, tris(acetylacetonato)ruthenium(III) of 1.69 mmol, and sodium phosphinate of 0.338 mmol were dissolved into ethylene glycol of 300 ml. An ethylene glycol solution of 100 ml into which a carbon support of 0.5 g (Vulcan XC-72R available from E-TEK Inc., Somerset, N.J., with the specific surface area of 254 m$^2$/g) was dispersed was added thereto. A sulfuric acid solution was added, and the pH value of the solution was adjusted to 3 using a pH litmus paper. In a nitrogen gas atmosphere, the solution was stirred and refluxed for 4 hours at 200° C., thereby depositing Pt—Ru—P catalyst particulates on the carbon support. Subsequent filtration, washing, and drying gave a catalyst.

EXAMPLE 2

Bis(acetylacetonato)platinum(II) of 1.69 mmol, tris(acetylacetonato)ruthenium(III) of 1.69 mmol, and sodium dihydrogenphosphite of 0.338 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was added, and the pH value of the solution was adjusted to 3 using a pH litmus paper. In a nitrogen gas atmosphere, the solution was stirred and refluxed for 4 hours at 200° C., thereby depositing Pt—Ru—P catalyst particulates on the carbon support. Subsequent filtration, washing, and drying gave a catalyst.

COMPARATIVE EXAMPLE 1

Bis(acetylacetonato)platinum(II) of 1.69 mmol and tris (acetylacetonato)ruthenium(III) of 1.69 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was added, and the pH value of the solution was adjusted to 3 using a pH litmus paper. In a nitrogen gas atmosphere, the solution was stirred and refluxed for 4 hours at 200° C., thereby depositing Pt—Ru catalyst particulates on the carbon support. Subsequent filtration, washing, and drying gave a catalyst.

COMPARATIVE EXAMPLE 2

Bis(acetylacetonato)platinum(II) of 1.69 mmol, tris(acetylacetonato)ruthenium(III) of 1.69 mmol, and ammonium molybdate of 0.338 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was added, and the pH value of the solution was adjusted to 3 using a pH litmus paper. In a nitrogen gas atmosphere, the solution was stirred and refluxed for 4 hours at 200° C., thereby depositing Pt—Ru—Mo catalyst particulates on the carbon support. Subsequent filtration, washing, and drying gave a catalyst.

COMPARATIVE EXAMPLE 3

Bis(acetylacetonato)platinum(II) of 1.69 mmol, tris(acetylacetonato)ruthenium(III) of 1.69 mmol, and sodium tungstate of 0.338 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was added, and the pH value of the solution was adjusted to 3 using a pH litmus paper. In a nitrogen gas atmosphere, the solution was stirred and refluxed for 4 hours at 200° C., thereby depositing Pt—Ru—W catalyst particulates on the carbon support. Subsequent filtration, washing, and drying gave a catalyst.

COMPARATIVE EXAMPLE 4

Bis(acetylacetonato)platinum(II) of 1.69 mmol, tris(acetylacetonato)ruthenium(III) of 1.69 mmol, and tris(acetylacetonato)iron(III) of 0.338 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was added, and the pH value of the solution was adjusted to 3 using a pH litmus paper. In a nitrogen gas atmosphere, the solution was stirred and refluxed for 4 hours at 200° C., thereby depositing Pt—Ru—Fe catalyst particulates on the carbon support. Subsequent filtration, washing, and drying gave a catalyst.

COMPARATIVE EXAMPLE 5

Bis(acetylacetonato)platinum(II) of 1.69 mmol, tris(acetylacetonato)rutheniu(III) of 1.69 mmol, and Bis (acetylacetonato)cobalt(II) of 0.338 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was dropped, and the pH value of the solution was adjusted to 3 using a pH litmus paper. In a nitrogen gas atmosphere, the solution was stirred and refluxed for 4 hours at 200° C., thereby depositing Pt—Ru—Co catalyst particulates on the carbon support. Subsequent filtration, washing, and drying gave a catalyst.

The particle sizes of the catalysts obtained in the above inventive examples 1 and 2, and the comparative examples 1 to 5 were observed with an electron microscope. Table 1 below shows the observation result. Though the particle sizes of the catalysts obtained in the comparative examples 1 to 5 range to 10 nm, the particle sizes of the Pt—Ru—P catalysts obtained in the inventive examples 1 and 2 fall within the range of 1 to 3 nm.

TABLE 1

| Sample | Catalyst | Particle size (nm) |
| --- | --- | --- |
| Example 1 | Pt—Ru—P | 1-3 |
| Example 2 | Pt—Ru—P | 1-3 |
| Comparative example 1 | Pt—Ru | ≦10 |
| Comparative example 2 | Pt—Ru—Mo | ≦10 |
| Comparative example 3 | Pt—Ru—W | ≦10 |
| Comparative example 4 | Pt—Ru—Fe | ≦10 |
| Comparative example 5 | Pt—Ru—Co | ≦10 |

Figure 3A:
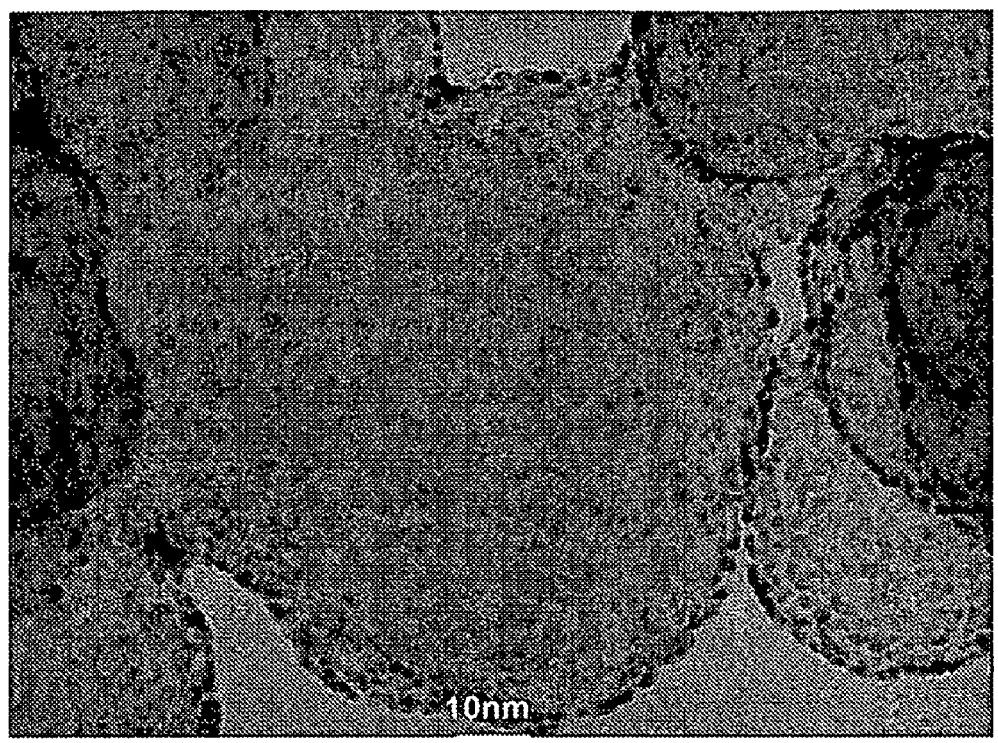
FIG. 3A shows an electron microscopic image of the Pt—Ru—P particulate catalyst on the carbon support of the example 1.
Figure 3B:
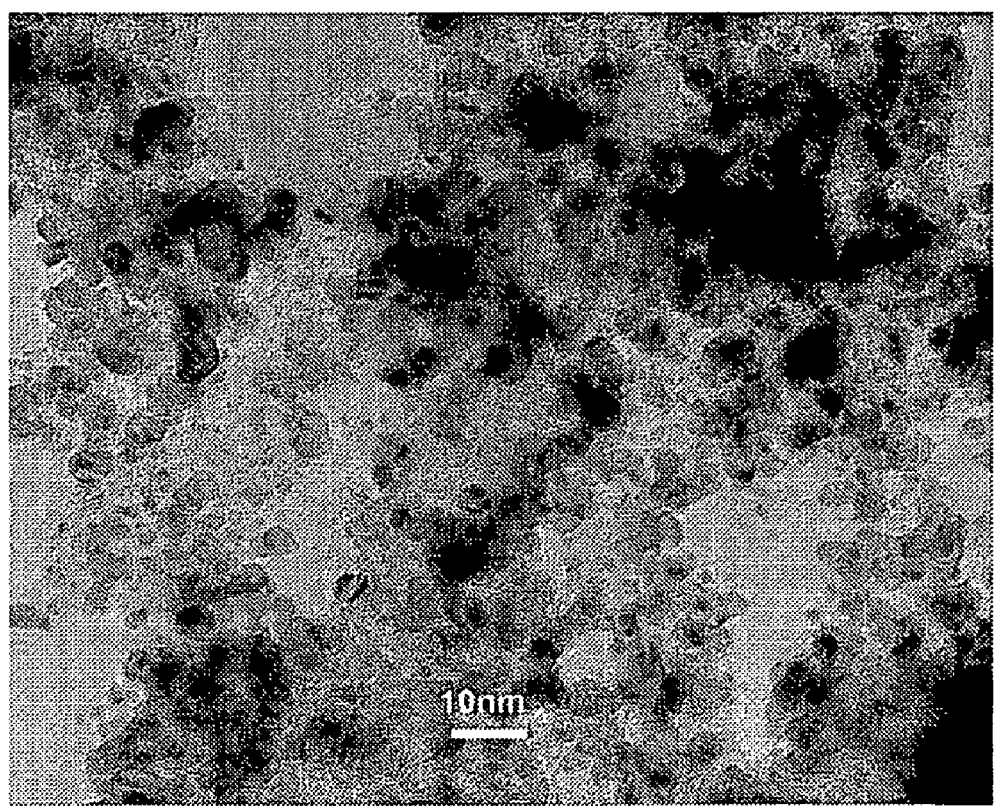
FIG. 3B shows the Pt—Ru particulate catalyst on the carbon support of the comparative example 1.

The surface of the Pt—Ru—P particulate catalyst on a carbon support obtained in inventive example 1 and the Pt—Ru particulate catalyst on a carbon support obtained in the comparative example 1 were observed with a transmission electron microscope. The observation results are shown in FIGS. 3A and 3B. FIG. 3A shows an electron microscopic image of the Pt—Ru—P particulate catalyst on the carbon support of the example 1, and FIG. 3B shows the Pt—Ru particulate catalyst on the carbon support of the comparative example 1. In these images, black to gray black portions are the catalyst particulates, and light gray to ash gray portions are the carbon supports. As is obvious from the picture of FIG. 3A, the Pt—Ru—P catalyst particulates of this invention have the size of about 1 to 3 nm, and the particulates are well dispersed and almost no cluster exists. On the other hand, the Pt—Ru catalyst particulates of the comparative example 1 include the particulate size of as large as 10 nm and some particulate clusters exist, as in FIG. 3B.

Then, 30 mg of each of the catalysts obtained in the above inventive examples 1 and 2, and the comparative examples 1 to 5 was dispersed into $H_2SO_4$ with the methanol concentration of 25 vol % and electrolyte of 1.5 mol/l and swept between the potential values of 0.2 to 0.6 V vs. normal hydrogen electrode (NHE) at a sweep rate of 0.01V/sec, using a Au line for a working electrode at 25° C., thereby measuring methanol oxidation activity. The methanol oxidation current at the potential of 0.6 V vs. NHE is shown in Table 2 below. Table 2 shows that a larger methanol oxidation current was obtained in the Pt—Ru—P catalysts obtained in the inventive examples 1 and 2 than in the catalysts obtained in the comparative examples 1 to 5, which indicates improvement in the methanol oxidation activity.

TABLE 2

| Sample | Catalyst | Methanol oxidation current (mA at 0.6 V vs. NHE) |
| --- | --- | --- |
| Example 1 | Pt—Ru—P | 13 |
| Example 2 | Pt—Ru—P | 13 |
| Comparative example 1 | Pt—Ru | 7 |
| Comparative example 2 | Pt—Ru—Mo | 7 |
| Comparative example 3 | Pt—Ru—W | 7 |
| Comparative example 4 | Pt—Ru—Fe | 5 |
| Comparative example 5 | Pt—Ru—Co | 5 |

The composition of the Pt—Ru—P obtained in the inventive examples 1 and 2 was analyzed with X-ray fluorescence. The result was $Pt_{57}Ru_{37}P_6$ in the inventive example 1 and $Pt_{57}Ru_{38}P_5$ in the inventive example 2.

EXAMPLE 3

An alcohol solution of pure water and NAFION® dispersion solution, available from E.I. DuPont de Nemours and Company, Wilmington, Del., was added to the Pt—Ru—P catalyst deposited on the Vulcan XC-72R obtained in inventive example 1 and stirred, and then its viscosity was adjusted to create a catalyst ink. The catalyst ink was then applied onto TEFLON® sheet, available also from DuPont, in such a way that the amount of the Pt—Ru—P catalyst is 5 mg/cm$^2$. After being dried, the TEFLON® sheet was peeled off, thereby creating a methanol electrode catalyst. Further, an alcohol solution of pure water and NAFION® dispersion solution was added to the Pt catalyst deposited on Ketjen EC, available from Ketjen Black International. Co., Tokyo, Japan, and stirred, and then its viscosity was adjusted to create a catalyst ink. The catalyst ink was then applied onto TEFLON® sheet in such a way that the amount of the Pt catalyst is 5 mg/cm$^2$. After being dried, the TEFLON® sheet was peeled off, thereby creating an oxygen electrode catalyst. Then, the Pt—Ru—P electrode catalyst and the Pt electrode catalyst were hot pressed to both sides of a polymer electrolyte membrane (NAFION® membrane, available from DuPont), thereby producing a membrane electrode assembly. Using the methanol electrode, polymer electrolyte membrane, oxygen electrode, and a methanol solution of 15 wt % as a liquid fuel, a direct methanol fuel cell was produced.

Figure 4:
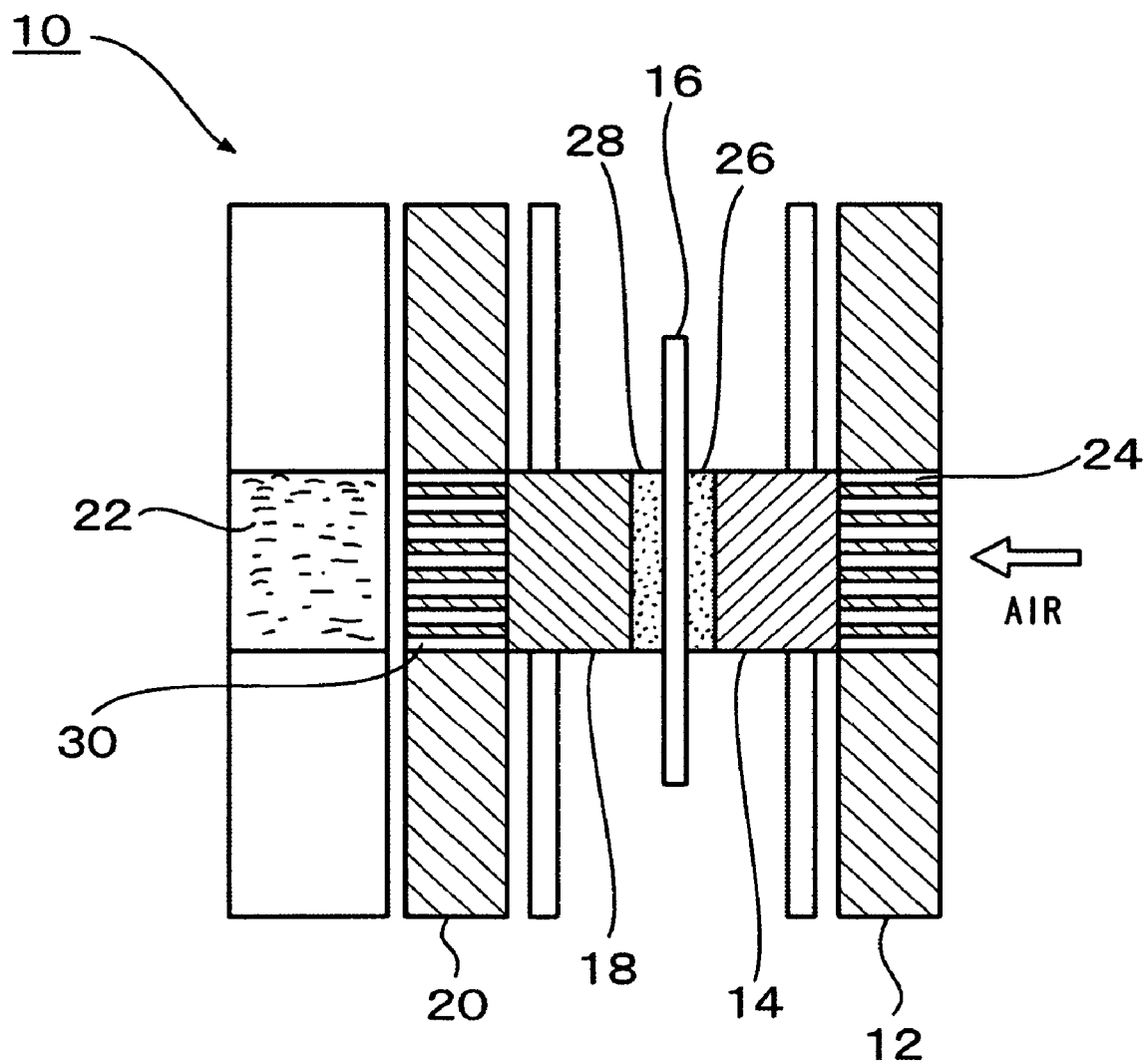
FIG. 4 is a partial schematic block diagram of an example of a direct methanol fuel cell.

The direct methanol fuel cell 10 of FIG. 4 includes an oxygen electrode side charge collector 12, an oxygen electrode side diffusion layer 14, a polymer electrolyte membrane 16, a methanol electrode side diffusion layer 18, a methanol electrode side charge collector 20, a methanol fuel tank 22, an air intake opening 24, an oxygen electrode (Pt) catalyst layer 26, a methanol electrode (Pt—Ru—P) catalyst layer 28, and a methanol fuel intake opening 30.

The oxygen electrode side charge collector 12 serves as a structure to take in the air (oxygen) through the air intake opening 24 and also as a power collector. The polymer electrolyte membrane 16 (NAFION® membrane, available from DuPont) serves as a carrier for carrying protons generated in the methanol electrode to the oxygen electrode, and also as a separator for preventing the short-circuit of the methanol electrode and the oxygen electrode. In the direct methanol fuel cell 10 thus composed, the liquid fuel supplied from the methanol electrode side charge collector 20 passes through the methanol electrode side diffusion layer 18 and enters the methanol electrode catalyst layer 28 where it is oxidized into $CO_2$, an electron, and a proton. The proton passes through the polymer electrolyte membrane 16 and moves to the oxygen electrode side. In the oxygen electrode, the oxygen entering from the oxygen electrode side charge collector 12 is reduced by the electron generated in the methanol electrode, and this oxygen and the proton react to generate water. The direct methanol fuel cell 10 of FIG. 4 generates electric power by the methanol oxidation reaction and the oxygen reduction reaction.

COMPARATIVE EXAMPLE 6

The comparative example 6 produced the direct methanol fuel cell in the same manner as the example 3 except that it used Pt—Ru catalyst, instead of the Pt—Ru—P catalyst, for the methanol electrode catalyst.

COMPARATIVE EXAMPLE 7

The comparative example 7 produced the direct methanol fuel cell in the same manner as the inventive example 3 except that it used Pt—Ru—Mo catalyst, instead of the Pt—Ru—P catalyst, for the methanol electrode catalyst.

COMPARATIVE EXAMPLE 8

The comparative example 8 produced the direct methanol fuel cell in the same manner as the inventive example 3 except that it used Pt—Ru—W catalyst, instead of the Pt—Ru—P catalyst, for the methanol electrode catalyst.

COMPARATIVE EXAMPLE 9

The comparative example 9 produced the direct methanol fuel cell in the same manner as the example 3 except that it used Pt—Ru—Fe catalyst, instead of the Pt—Ru—P catalyst, for the methanol electrode catalyst.

COMPARATIVE EXAMPLE 10

The comparative example 10 produced the direct methanol fuel cell in the same manner as the inventive example 3 except that it used Pt—Ru—Co catalyst, instead of the Pt—Ru—P catalyst, for the methanol electrode catalyst.

The measurement result of the power density of each of the direct methanol fuel cells obtained in the inventive example 3 and the comparative examples 6 to 10 is shown in Table 3 below. The direct methanol fuel cell of the inventive example 3 using the Pt—Ru—P catalyst as the methanol electrode catalyst has the power density of 50 mW/cm². The direct methanol fuel cells of the comparative examples 6 to 10 using a catalyst different from the Pt—Ru—P catalyst as the methanol electrode catalyst have the power density of 40 mW/cm² or less. This result shows that use of the Pt—Ru—P catalyst with the particulate size of 1 to 3 nm as the methanol electrode catalyst allows improving the cell characteristics.

TABLE 3

| Sample | Catalyst | Power density (mW/cm²) |
| --- | --- | --- |
| Example 3 | Pt—Ru—P | 50 |
| Comparative example 6 | Pt—Ru | 40 |
| Comparative example 7 | Pt—Ru—Mo | 40 |
| Comparative example 8 | Pt—Ru—W | 40 |
| Comparative example 9 | Pt—Ru—Fe | 35 |
| Comparative example 10 | Pt—Ru—Co | 36 |

EXAMPLE 4

Bis(acetylacetonato)platinum(II) of 1.69 mmol, tris(acetylacetonato)ruthenium(III) of 1.69 mmol, and sodium phosphinate ($NaPH_{2O2}$) of 5 to 100 mol % of the total moles of Pt and Ru were dissolved into ethylene glycol of 300 ml. An ethylene glycol solution of 100 ml into which a carbon support of 0.5 g (Vulcan XC-72R, specific surface area of 254 m²/g) was dispersed was added thereto. A sulfuric acid solution was added into this solution and the pH value of the solution was adjusted to 3 using a pH litmus paper. In a nitrogen gas atmosphere, the solution was stirred and refluxed in an oil bath at 200° C., thereby depositing Pt—Ru—P catalyst particulates on the carbon support. Subsequent filtration, washing, and drying gave catalyst.

The X-ray diffraction analysis was performed on the Pt—Ru—P catalyst obtained in the inventive example 4, and the particulate size of the Pt—Ru—P catalyst was determined by the Scherrer's equation. Then, the composition of the catalyst was analyzed by X-ray fluorescence (XRF) and X-ray photoelectron spectroscopy analysis (XPS). Since each analysis showed that P was likely to exist on the surface of the Pt—Ru catalyst, the XPS which can measure the composition closer to the catalyst surface was used for the measurement of the P concentration. Further, the methanol oxidation characteristics of the Pt—Ru—P catalyst were measured. The measurement process is as follows. A 30 mg of catalyst was dispersed into $H_2SO_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The measurement result is shown in Table 4 below. It shows that adding 5 to 50 mol % of the sodium phosphinate of the total moles of Pt—Ru allows producing a high methanol oxidation current. If, however, 70 mol % or higher sodium phosphinate of the total moles of Pt—Ru was added, too much sodium phosphinate inhibited the Pt—Ru particulate formation and caused the reduction of the bis-(acetylacetonato)platinum(II), resulted in significant decrease in the methanol oxidation activity.

TABLE 4

| NaPH$_2$O$_2$ additive rate (mol %) | Particle size (nm) | Pt—Ru Composition (at. % by XRF) | P Composition (at. % by XPS) | Methanol oxidation current (mA at 0.6 V vs. NHE) |
|---|---|---|---|---|
| 5 | 1.8 | Pt$_{60}$—Ru$_{40}$ | 3 | 11 |
| 10 | 1.6 | Pt$_{60}$—Ru$_{40}$ | 10 | 13 |
| 20 | 1.6 | Pt$_{61}$—Ru$_{39}$ | 16 | 16 |
| 50 | 1.3 | Pt$_{69}$—Ru$_{31}$ | 27 | 25 |
| 70 | 1.2 | Pt$_{61}$—Ru$_{39}$ | 55 | 3 |
| 100 | 1.4 | Pt$_{70}$—Ru$_{30}$ | 65 | 3 |

EXAMPLE 5

Bis(acetylacetonato)platinum(II) and tris(acetyl-acetonato)ruthenium (III), the ratio of which was 1:2 to 2:1, and sodium phosphinate of 50 mol % of the total moles of Pt—Ru were dissolved into ethylene glycol of 300 ml. An ethylene glycol solution of 100 ml where a carbon support of 0.5 g (Vulcan XC-72R with the specific surface area of 254 m$^2$/g) was dispersed was added thereto. A sulfuric acid solution was dropped thereto, and its pH value was adjusted to 3 using a pH litmus paper. In a nitrogen gas atmosphere, the solution was stirred and refluxed in an oil bath at 200° C., thereby depositing Pt—Ru—P catalyst particulates on the carbon support. Subsequent filtration, washing, and drying gave a catalyst.

The X-ray diffraction analysis was performed on the Pt—Ru—P catalyst obtained in the inventive example 5, and the particulate size of the Pt—Ru—P catalyst was determined by the Scherrer's equation. Then, the composition of the catalyst was analyzed with the X-ray fluorescence. Further, the methanol oxidation characteristics of the Pt—Ru—P catalyst were measured. The measurement process is as follows. A 30 mg of catalyst was dispersed into H$_2$SO$_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The measurement result is shown in Table 5 below.

TABLE 5

| Ratio of Pt and Ru | Catalyst Particle size (nm) | Composition (at. %) | Methanol oxidation current (mA at 0.6 V vs. NHE) |
|---|---|---|---|
| 1:2 | 1.7 | Pt$_{46}$—Ru$_{48}$—P$_6$ | 9 |
| 1:1.5 | 1.7 | Pt$_{53}$—Ru$_{37}$—P$_{10}$ | 11 |
| 1:1 | 1.3 | Pt$_{65}$—Ru$_{29}$—P$_6$ | 25 |
| 1.5:1 | 1.5 | Pt$_{73}$—Ru$_{21}$—P$_6$ | 34 |
| 2:1 | 1.7 | Pt$_{80}$—Ru$_{14}$—P$_6$ | 27 |

The measurement result of Table 5 shows that setting the ratio of Pt and Ru to 1:2 to 2:1 allows producing the Pt—Ru—P catalyst where the Pt composition is 40 to 90 at. % and the P is 5 at. % or higher, thereby creating a high methanol oxidation current.

EXAMPLE 6

Bis(acetylacetonato)platinum(II) of 1.69 mmol, tris(acetylacetonato)ruthenium(III) of 1.69 mmol, and sodium phosphinate of 0.338 mmol were dissolved into ethylene glycol of 300 ml. An ethylene glycol solution of 100 ml into which a carbon support of 0.5 g (Vulcan P with the specific surface area of 140 m$^2$/g) was dispersed was added thereto. A sulfuric acid solution was added into this solution, and the pH value of the solution was adjusted to 3 using a pH litmus paper. In a nitrogen gas atmosphere, the solution was stirred and refluxed in an oil bath at 200° C. for 4 hours, thereby depositing Pt—Ru—P catalyst particulates on the carbon support. Subsequent filtration, washing, and drying gave a catalyst.

The sizes of catalyst particulates obtained in the inventive example 6 was observed with an electron microscope. Table 6 below shows the observation result. The particulate sizes of the Pt—Ru—P catalyst were in the range of 1 to 3 nm in the inventive example 6.

TABLE 6

| | Catalyst | Catalyst Particle size (nm) |
|---|---|---|
| Example 6 | Pt—Ru—P | 1-3 |

The methanol oxidation activity of the catalyst obtained in the inventive example 6 was observed. The measurement process is as follows. A 30 mg of each catalyst was dispersed into H$_2$SO$_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The methanol oxidation activity was thus measured. The current density at the potential 0.6 V vs. NHE was shown in Table 7 below. Table 7 shows the result of the inventive example 1, too. The inventive examples 6 and 1 where the specific surfaces of the carbon supports were 140 m$^2$/g and 254 m$^2$/g, respectively, created a high methanol oxidation current.

Further, in the case of using Vulcan P with the specific surface of the 140 m$^2$/g, the methanol oxidation current was higher than the case of using Vulcan XC-72R with the specific surface of the 254 m$^2$/g. This is because the Vulcan P with the small specific surface had a smaller number of pores with a larger diameter, and thereby the number of particulates of the Pt—Ru—P catalyst creating three-phase interfaces (catalyst/methanol/acid) increased.

TABLE 7

| | Catalyst | Support specific surface (m$^2$/g) | Methanol oxidation current (mA at 0.6 V vs. NHE) |
|---|---|---|---|
| Example 6 | Pt—Ru—P | 140 | 19 |
| Example 1 | Pt—Ru—P | 254 | 13 |

EXAMPLE 7

Bis(acetylacetonato)platinum(II) of 1.69 mmol, tris(acetylacetonato)ruthenium(III) of 1.69 mmol, and sodium phosphinate of 1.69 mmol were dissolved into ethylene glycol of 300 ml. An ethylene glycol solution of 100 ml into which a carbon support of 0.5 g (Vulcan XC-72R with the specific surface area of 254 m$^2$/g) was dispersed was added thereto. A sulfuric acid solution was added into this solution, and the pH value of the solution was adjusted to 3 using a pH litmus paper. In a nitrogen gas atmosphere, the solution was stirred and refluxed in an oil bath at 200° C. for 4 hours, thereby depositing Pt—Ru—P catalyst particulates on the carbon support. Subsequent filtration, washing, and drying gave a catalyst. The observation of the size of the obtained Pt—Ru—P catalyst with the electron microscope showed 1 to 3 nm. The analysis of the composition with X-ray fluorescence showed $Pt_{65}Ru_{29}P_6$.

EXAMPLE 8

Bis(acetylacetonato)platinum(II) of 1.69 mmol, tris(acetylacetonato)ruthenium(III) of 1.69 mmol, and sodium phosphinate of 1.69 mmol were dissolved into ethylene glycol of 300 ml. An ethylene glycol solution of 100 ml into which a carbon support of 0.5 g (Vulcan P with the specific surface area of 140 $m^2/g$) was dispersed was added thereto. A sulfuric acid solution was added into this solution, and the pH value of the solution was adjusted to 3 using a pH litmus paper. In a nitrogen gas atmosphere, the solution was stirred and refluxed in an oil bath at 200° C. for 4 hours, thereby depositing Pt—Ru—P catalyst particulates on the carbon support. Subsequent filtration, washing, and drying gave a catalyst. The observation of the size of the obtained Pt—Ru—P catalyst with the electron microscope showed 1 to 3 nm. The analysis of the composition with X-ray fluorescence showed $Pt_{65}Ru_{29}P_6$.

EXAMPLE 9, 10 AND COMPARATIVE EXAMPLE 11

An alcohol solution of pure water and NAFION® dispersion solution, available from DuPont, was added to each of the Pt—Ru—P catalysts obtained in the examples 7 and 8 and stirred, and then its viscosity was adjusted to create a catalyst ink. The catalyst ink was then applied onto TEFLON® sheet, available also from DuPont, in such a way that the amount of the Pt—Ru—P catalyst is 5 $mg/cm^2$. After being dried, the TEFLON® sheet was peeled off, thereby creating a methanol electrode catalyst. Further, an alcohol solution of pure water and NAFION® dispersion solution was added to the Pt catalyst deposited on Ketjen EC and stirred, and then its viscosity was adjusted to create a catalyst ink. The catalyst ink was then applied onto TEFLON® sheet in such a way that the amount of the Pt catalyst was 5 $mg/cm^2$. After dried, the TEFLON® sheet was peeled off, thereby creating an oxygen electrode catalyst. Then, the Pt—Ru—P electrode catalyst and the Pt electrode catalyst were hot pressed to both sides of a polymer electrolyte membrane (NAFION® membrane, available also from DuPont), thereby producing a membrane electrode assembly. Using the methanol electrode, polymer electrolyte membrane, oxygen electrode, and a methanol solution of 15 wt % as a liquid fuel, a direct methanol fuel cell shown in FIG. 4 was produced. Table 8 below shows the observation result of the power density characteristics of the direct methanol fuel cell. Table 8 includes the power density characteristics in the comparative example 11 where the Pt—Ru catalyst is used as a methanol electrode catalyst. In the case of using the Vulcan P support with the specific surface area of 140 $m^2/g$, the power density was 65 $mW/cm^2$. In the case of using the Vulcan XC-72R support with the specific surface area of 254 $m^2/g$, on the other hand, the power density was 59 $mW/cm^2$. As described above, since the Vulcan P support with the smaller specific surface had a smaller number of pores with a larger diameter than the Vulcan XC-72R support, the Pt—Ru—P catalyst particulates were not likely to be buried into the pores to cease to function as a catalyst, thereby increasing the number of particulates of the Pt—Ru—P catalyst creating three-phase interfaces (catalyst/electlyte/methanol).

TABLE 8

| Electrode catalyst | pH | Ratio of Pt and Ru | $NaPH_2O_2$ additive rate (mol %) | Support specific surface ($m^2/g$) | Power density ($mW/cm^2$) |
|---|---|---|---|---|---|
| Example 9 | 3 | 1:1 | 50 | 254 | 59 |
| Example 10 | 3 | 1:1 | 50 | 140 | 65 |
| Comparative example 11 | 3 | 1:1 | — | 254 | 40 |

EXAMPLE 11 AND 12

An alcohol solution of pure water and NAFION® dispersion solution, available from DuPont, was added to each of the Pt—Ru—P catalysts obtained in the inventive examples 7 and 8 and stirred, and then its viscosity was adjusted to create a catalyst ink. The catalyst ink was then applied onto TEFLON® sheet, available also from DuPont, in such a way that the amount of the Pt—Ru—P catalyst was 5 $mg/cm^2$. After being dried, the TEFLON® sheet was peeled off, thereby creating a hydrogen electrode catalyst. Further, an alcohol solution of pure water and NAFION® dispersion solution was added to Pt catalyst deposited on a Ketjen EC support and stirred, and its viscosity was adjusted to create a catalyst ink. The catalyst ink was then applied onto TEFLON® sheet in such a way that the amount of the Pt catalyst was 5 $mg/cm^2$. After being dried, the TEFLON® sheet was peeled off, thereby creating an oxygen electrode catalyst. Then, the Pt—Ru—P electrode catalyst and the Pt electrode catalyst were hot pressed to both sides of a polymer electrolyte membrane (NAFION® membrane), thereby producing a membrane electrode assembly. Using the hydrogen electrode, polymer electrolyte membrane, oxygen electrode, and a hydrogen gas as a fuel, a polymer electrolyte fuel cell shown in FIG. 5 was produced.

Figure 5:
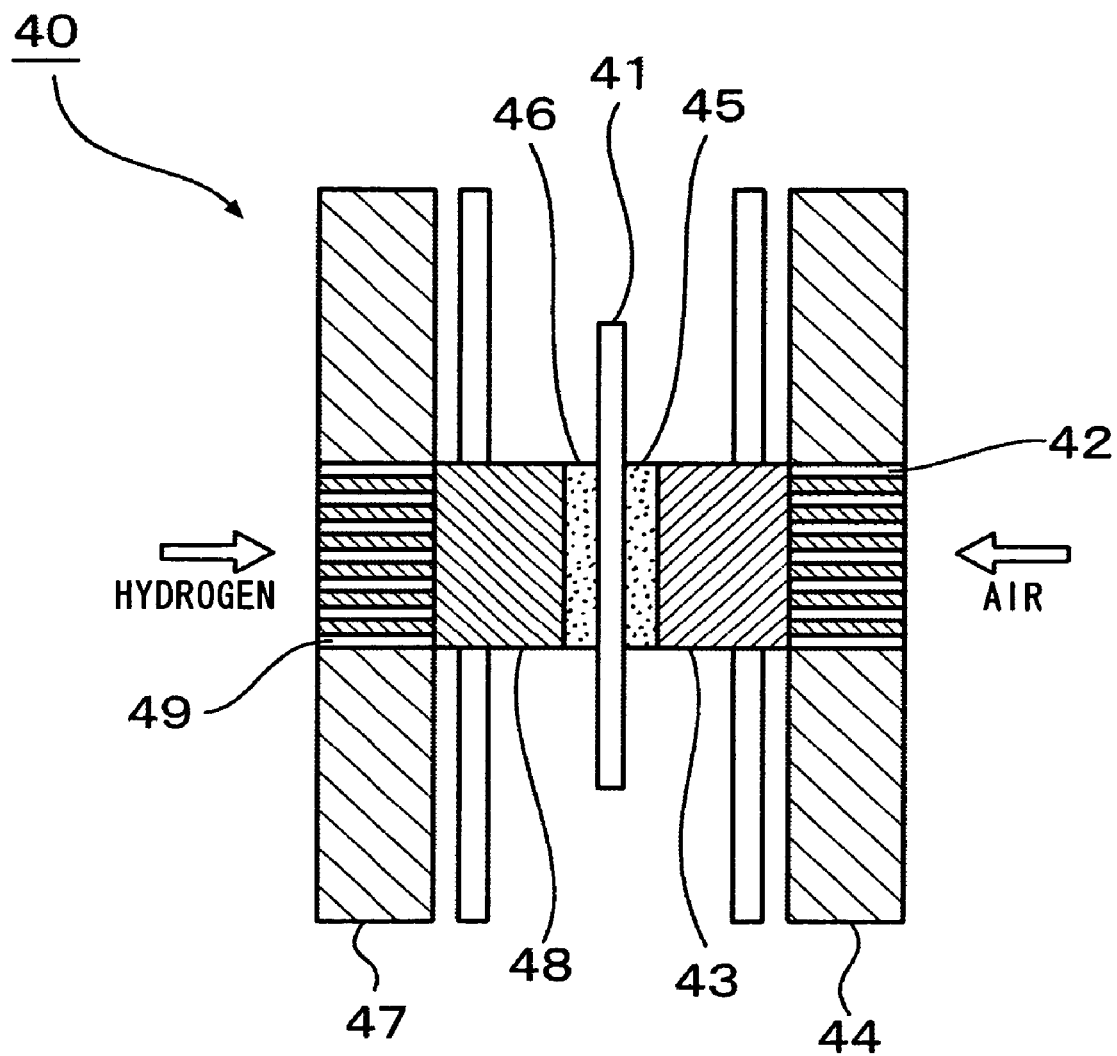
FIG. 5 is a partial schematic block diagram of an example of a polymer electrolyte fuel cell.

The polymer electrolyte fuel cell 40 of FIG. 5 includes an oxygen electrode side charge collector 44, an oxygen electrode side diffusion layer 43, a polymer electrolyte membrane 41, a methanol electrode side diffusion layer 48, a hydrogen electrode side charge collector 47, an air intake opening 42, an oxygen electrode (Pt) catalyst layer 45, a hydrogen electrode (Pt—Ru—P) catalyst layer 46, and a hydrogen fuel intake opening 49.

The oxygen electrode side charge collector 44 serves as a structure to take in the air (oxygen) through the air intake opening 42 and also as a power collector. The polymer electrolyte membrane 41 (NAFION® membrane) serves as a carrier for carrying proton generated in the hydrogen electrode to the oxygen electrode side, and also as a separator for preventing the short-circuit of the hydrogen electrode and the oxygen electrode. In the polymer electrolyte fuel cell 40 thus composed, the hydrogen gas supplied from the hydrogen electrode side charge collector 47 passes through the hydrogen electrode side diffusion layer 48 and enters the hydrogen electrode catalyst layer 46 where it is oxidized into an electron and a proton. The proton passes through the polymer electrolyte membrane 41 and moves to the oxygen electrode side. In the oxygen electrode, the oxygen entering from the oxygen electrode side charge collector 44 is reduced by the electron generated in the hydrogen electrode, and this oxygen and the proton react to generate water. The polymer electrolyte fuel cell 40 of FIG. 5 generates electric power by the hydrogen oxidation reaction and the oxygen reduction reaction.

COMPARATIVE EXAMPLE 12

For comparative example 12 the polymer electrolyte fuel cell is produced in the same manner as the inventive example 11 and 12 except that it used Pt—Ru catalyst created in the comparative example 1 for the hydrogen electrode catalyst.

The measurement result of the power density of each of the polymer electrolyte fuel cells obtained in the inventive example 11 and 12 and the comparative example 12 is shown in the Table 9 below. The polymer electrolyte fuel cell of the inventive example 11 and 12 uses the Pt—Ru—P catalyst with the particulate size of 1 to 3 nm and has a high power density. In the polymer electrolyte fuel cell as well, use of Vulcan P having a smaller support surface area shows a higher power density. If the support is Vulcan P having a small specific surface, it enhances the Pt—Ru—P catalyst particulates to create three-phase interfaces, which increases the number of active catalyst particulates to make higher power density. On the other hand, the polymer electrolyte fuel cell of the comparative example 12 uses the Pt—Ru catalyst with the particulate size up to 10 nm and thus has a low power density of 120 mW/cm$^2$.

TABLE 9

| Electrode catalyst | pH | Ratio of Pt and Ru | NaPH$_2$O$_2$ additive rate (mol %) | Support specific surface (m$^2$/g) | Power density (mW/cm$^2$) |
|---|---|---|---|---|---|
| Example 11 (Pt—Ru—P) | 3 | 1:1 | 50 | 254 | 180 |
| Example 12 (Pt—Ru—P) | 3 | 1:1 | 50 | 140 | 200 |
| Comparative example 12 (Pt—Ru) | 3 | 1:1 | — | 254 | 120 |

EXAMPLE 13

Bis(acetylacetonato)platinum(II) and tris(acetyl-acetonato)ruthenium(III), the ratio of which was 1.5:1, and sodium phosphinate of 50 mol % of the total moles of Pt—Ru were dissolved into ethylene glycol of 300 ml. An ethylene glycol solution of 100 ml into which a carbon support of 0.5 g (Vulcan P with the specific surface area of 140 m$^2$/g) was dispersed was added thereto. At this time, the used amount of the bis(acetylacetonato)platinum(II) and the tris(acetylacetonato)ruthenium (III) was adjusted so that the loading rate of the Pt—Ru—P catalyst was 50 wt %. Then, a sulfuric acid solution was added thereto, and its pH value was adjusted to 3 using a pH litmus paper. In a nitrogen gas atmosphere, the solution was stirred and refluxed in an oil bath at 200° C. for 4 hours, thereby depositing Pt—Ru—P catalyst particulates on the carbon support. Subsequent filtration, washing, and drying gave the Pt—Ru—P catalyst with the loading rate of 50 wt %.

EXAMPLE 14

Bis(acetylacetonato)platinum(II) and tris(acetyl-acetonato)ruthenium(III), the ratio of which was changed to 1.5:1, and sodium phosphinate of 50 mol % of the total moles of Pt—Ru were dissolved into ethylene glycol of 300 ml. An ethylene glycol solution of 100 ml into which a carbon support of 0.5 g (Vulcan P with the specific surface area of 140 m$^2$/g) was dispersed was added thereto. At this time, the used amount of the bis(acetyl-acetonato)platinum(II) and the tris(acetylacetonato) ruthenium (III) was adjusted so that the loading rate of the Pt—Ru—P catalyst was 60 wt %. Then, a sulfuric acid solution was added thereto, and its pH value was adjusted to 3 using a pH litmus paper. In a nitrogen gas atmosphere, the solution was stirred and refluxed in an oil bath at 200° C. for 4 hours, thereby depositing Pt—Ru—P catalyst particulates on the carbon support. Subsequent filtration, washing, and drying gave the Pt—Ru—P catalyst with the loading rate of 60 wt %.

The methanol oxidation activity of the catalysts obtained in the inventive examples 13 and 14 was observed. The measurement process is as follows. A 30 mg of each catalyst was dispersed into H$_2$SO$_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The methanol oxidation activity was thus measured. The methanol oxidation current at the potential 0.6 V vs. NHE is shown in Table 10 below.

TABLE 10

| | pH | Ratio of Pt and Ru | NaPH$_2$O$_2$ additive rate (mol %) | Support specific surface (m$^2$/g) | Catalyst deposition rate (wt. %) | Methanol oxidation current (mA at 0.6 V vs. NHE) |
|---|---|---|---|---|---|---|
| Example 13 | 3 | 1.5:1 | 50 | 140 | 50 | 28 |
| Example 14 | 3 | 1.5:1 | 50 | 140 | 60 | 32 |

EXAMPLE 15 AND 16

The direct methanol fuel cell shown in FIG. 4 was produced using the Pt—Ru—P catalysts obtained in the inventive examples 13 and 14. Since the deposition rate of the catalysts was different between the inventive examples 13 and 14, the same amount of the catalyst, 5 mg/cm$^2$, was applied to the electrodes. The measurement result of the power density is shown in the Table 11 below. When the deposition rate of the Pt—Ru—P catalyst was 50 wt %, the power density was 70 mW/cm$^2$, and when the rate was 60 wt %, the power density was 80 mW/cm$^2$, showing high power densities. This result shows that the higher power density was obtained when the loading rate of the catalyst was higher, which is 60 wt %. This is because, even if the catalyst application amount to the electrode was the same, 5 mg/cm$^2$, the electrode becomes thinner when the loading rate of the catalyst was as high as 60 wt %, which increased the permeability of the methanol fuel.

TABLE 11

| | Catalyst application amount on electrode (mg/cm$^2$) | Catalyst deposition rate (wt. %) | Power density (mW/cm$^2$) |
|---|---|---|---|
| Example 15 | 5 | 50 | 70 |
| Example 16 | 5 | 60 | 80 |

EXAMPLE 17 AND 18

The polymer electrolyte fuel cell shown in FIG. 5 was produced using the Pt—Ru—P catalyst obtained in the examples 13 and 14. Since the loading rate of the catalysts was different between the inventive examples 13 and 14, the same amount of the catalyst, 5 mg/cm$^2$, was applied to the electrodes. The measurement result of the power density is shown in the Table 12 below. When the deposition rate of the Pt—Ru—P catalyst was 50 wt %, the power density was 220 mW/cm², and when the rate was 60 wt %, the power density was 240 mW/cm², showing high power densities. This result shows that the higher power density was obtained when the loading rate of the catalyst was higher, which is 60 wt %. This is because, even if the catalyst application amount to the electrode was the same, 5 mg/cm², the electrode becomes thinner when the loading rate of the catalyst was as high as 60 wt %, which increased the permeability of the hydrogen gas fuel.

TABLE 12

|  | Catalyst application amount on electrode (mg/cm²) | Catalyst deposition rate (wt. %) | Power density (mW/cm²) |
|---|---|---|---|
| Example 17 | 5 | 50 | 220 |
| Example 18 | 5 | 60 | 240 |

EXAMPLE 19

A carbon support (Vulcan XC-72R with the specific surface of 254 m²/g) of 0.25 g was dispersed into pure water of 60 ml. Then, hydrogen hexachloroplatinate hexahydrate of 0.844 mmol and ruthenium (III) chloride n-hydrate of 0.844 mmol were dissolved into pure water of 60 ml, and added thereto. Further, sodium phosphinate monohydrate of 5.908 mmol was dissolved into pure water of 70 ml and added thereto. After that, 3 mol/l of sodium hydroxide solution was added into the solution and the pH value of the solution was adjusted to 11. The solution was then stirred for 30 minutes at room temperature; then, the temperature of the solution was increased to 80° C. After that, electroless plating was performed for two hours while stirring, thereby depositing the catalyst particulates on the carbon support. Subsequent filtration, washing, and drying gave a catalyst.

The observation result of the particulate sizes of the catalyst obtained in the inventive example 19 showed 1 to 3 nm. The analysis result of the composition of the catalyst with X-ray fluorescence showed $Pt_{59}Ru_{34}P_7$.

The methanol oxidation activity of the Pt—Ru—P catalyst obtained in the inventive example 19 was observed. The measurement process is as follows. A 30 mg of each catalyst was dispersed into $H_2SO_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The methanol oxidation activity was thus measured. The methanol oxidation current at the potential of 0.6 V vs. NHE is shown in Table 13 below. Table 13 shows the methanol oxidation current of Pt—Ru of the comparative example 1 as well. In the Pt—Ru—P catalyst of the inventive example 19, the particulates sizes were decreased to 1 to 3 nm since P was added. This increased the active surface area to create a higher methanol oxidation current than in the comparative example 1. This example shows that the Pt—Ru—P catalyst with the particulate size of 1 to 3 nm can be created not only by the alcohol reduction method, but also by the electroless plating method. The electroless plating method does not use organic solvent such as alcohol and allows for the use of hydrogen hexachloroplatinate and ruthenium chloride for a supply source of Pt and Ru, thus having the advantage of significantly reducing catalyst costs.

TABLE 13

|  | Catalyst | Catalyst particle size (nm) | Methanol oxidation current (mA at 0.6 V vs. NHE) |
|---|---|---|---|
| Example 19 | Pt—Ru—P | 1-3 | 37 |
| Comparative Example 1 | Pt—Ru | ≦10 | 7 |

EXAMPLE 20

Bis(acetylacetonato)platinum(II) of 1.69 mmol, tris(acetylacetonato)ruthenium(III) of 1.69 mmol, and sodium phosphinate of 1.69 mmol were dissolved into ethylene glycol of 300 ml. An ethylene glycol solution of 100 ml into which a multi-walled carbon nanotube support of 0.5 g (the specific surface area of 30 m²/g) was dispersed was added thereto. A sulfuric acid solution was added into this solution, and the pH value of the solution was adjusted to 3 using a pH litmus paper. In a nitrogen gas atmosphere, the solution was stirred and refluxed in an oil bath at 200° C. for 4 hours, thereby depositing Pt—Ru—P catalyst particulates on the multi-walled carbon nanotube support. Subsequent filtration, washing, and drying gave a catalyst. The observation of the size of the obtained Pt—Ru—P catalyst with the electron microscope showed 1 to 3 nm. The analysis of the composition with X-ray fluorescence showed $Pt_{42}Ru_{39}P_{19}$.

EXAMPLE 21

The methanol oxidation activity of the Pt—Ru—P catalyst obtained in the inventive example 20 was observed. The measurement process is as follows. A 30 mg of the catalyst was dispersed into $H_2SO_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The methanol oxidation activity was thus measured. The methanol oxidation current at the potential of 0.6 V vs. NHE is shown in Table 14 below. Table 14 shows the methanol oxidation current of Pt—Ru of the comparative example 1 as well. In the Pt—Ru—P catalyst of the inventive example 20, the particulates sizes were decreased to 1 to 3 nm since P was added. This increased the active surface area to create a higher methanol oxidation current than in the comparative example 1.

TABLE 14

|  | Catalyst | Catalyst particle size (nm) | Methanol oxidation current (mA at 0.6 V vs. NHE) |
|---|---|---|---|
| Example 21 | Pt—Ru—P | 1-3 | 40 |
| Comparative Example 1 | Pt—Ru | ≦10 | 7 |

EXAMPLE 22

The direct methanol fuel cell shown in FIG. 4 was produced using the Pt—Ru—P catalysts obtained in the inventive examples 20. The measurement result of the power density is shown in the Table 15 below. Table 15 shows the power density of the inventive examples 9 and of the comparative example 11 as well. When the carbon support is multi-walled carbon nanotube, power density of 80 mW/cm² was achieved. This value is higher than that of inventive examples 9 although the size of the Pt—Ru—P catalyst particulates is same in 1 to 3 nm. Carbon black (Vulcan XC-72R, specific surface area of 254 m²/g) has pores in which Pt—Ru—P catalyst particulates are buried. Multi-walled carbon nanotube, however, has no pores so that all the Pt—Ru—P catalyst particulates can educe on the surface of multi-walled carbon nanotube. Thereby, the utilization rate of the Pt—Ru—P catalyst particulates was markedly enhances, which improved power density.

TABLE 15

| Electrode catalyst | pH | Ratio of Pt and Ru | $NaPH_2O_2$ additive rate (mol %) | Support specific surface ($m^2$/g) | Power density (mW/$cm^2$) |
|---|---|---|---|---|---|
| Example 22 | 3 | 1:1 | 50 | 30 | 80 |
| Example 9 | 3 | 1:1 | 50 | 254 | 59 |
| Comparative example 11 | 3 | 1:1 | — | 254 | 40 |

COMPARATIVE EXAMPLE 13

Bis(acetylacetonato)platinum(II) of 1.69 mmol and tris(acetylacetonato)ruthenium(III) of 1.69 mmol were dissolved into ethylene glycol of 300 ml. An ethylene glycol solution of 100 ml into which a multi-walled carbon nanotube support of 0.5 g (the specific surface area of 30 m²/g) was dispersed was added thereto. A sulfuric acid solution was added into this solution, and the pH value of the solution was adjusted to 3 using a pH litmus paper. In a nitrogen gas atmosphere, the solution was stirred and refluxed in an oil bath at 200° C. for 4 hours, thereby depositing Pt—Ru catalyst particulates on the multi-walled carbon nanotube support. Subsequent filtration, washing, and drying gave a catalyst. The observation of the size of the obtained Pt—Ru catalyst with the electron microscope showed ~10 nm. The analysis of the composition with X-ray fluorescence showed $Pt_{54}RU_{46}$.

COMPARATIVE EXAMPLE 14

The methanol oxidation activity of the Pt—Ru catalyst obtained in the comparative example 13 was observed. The measurement process is as follows. A 30 mg of the catalyst was dispersed into $H_2SO_4$ with the methanol concentration of 25 vol % and electrolyte of 1.5 mol/l and swept between the potential values of 0.2 to 0.6 V vs. NHE at a sweep rate of 0.01V/sec, using an Au line for a working electrode at 25° C. The methanol oxidation activity was thus measured. The methanol oxidation current at the potential of 0.6 V vs. NHE was 7 mA. This low methanol oxidation current is due to the large size of Pt—Ru catalyst particulates of ~10 nm because P is not added.

COMPARATIVE EXAMPLE 15

The direct methanol fuel cell shown in FIG. 4 was produced using the Pt—Ru catalysts obtained in the comparative examples 13. The measurement result of the power density was 42 mW/cm². This low power density is due to the large size of Pt—Ru catalyst particulates of ~10 nm because P is not added.

EXAMPLE 23

Figure 6A:
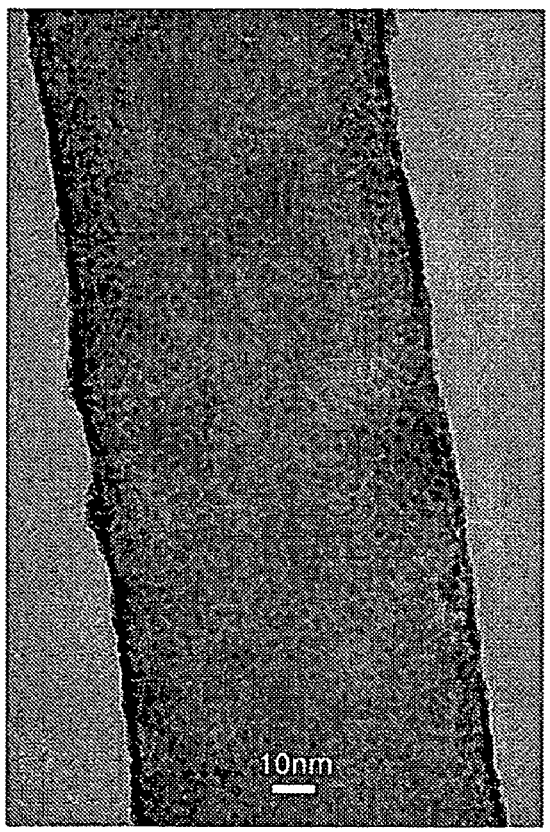
FIG. 6A is an electron microscope image of the Pt—Ru—P catalyst on a multi-walled carbon nanotube support of the example 20.
Figure 6B:
FIG. 6B is an electron microscope image of the Pt—Ru catalyst on a multi-walled carbon nanotube support of comparative example 13.

The Pt—Ru—P catalyst particulates of inventive examples 20 were observed by transmission electron microscope. The observation results are shown in FIGS. 6A and 6B. FIG. 6A shows the Pt—Ru—P catalyst particulates of inventive examples 20, and FIG. 6B shows the Pt—Ru catalyst particulates of comparative examples 13. In these images, black to gray black portions are the catalyst particulates, and light gray to ash gray portions are the carbon supports. As is obvious from the picture of FIG. 6A, the Pt—Ru—P catalyst particulates of inventive example 20 have the size of about 2 to 3 nm, and the particulates are well dispersed and no cluster exists. On the other hand, the Pt—Ru catalyst particulates of the comparative example 13 include the particulate size of as large as 10 nm and some particulate clusters exist, as in FIG. 6B.

EXAMPLE 24

Bis(acetylacetonato)platinum(II) of 1.69 mmol and sodium hypophosphite of 0.845 mmol were dissolved into ethylene glycol of 200 ml and added to an ethylene glycol solution of 200 ml that contains dispersed multiwalled carbon nanotube (MWCNT) with a specific surface area of 30 m²/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the multiwalled carbon nanotube. After the reaction ends, filtration, washing, and drying were performed, thereby producing catalyst.

EXAMPLE 25

Bis(acetylacetonato)platinum(II) of 1.69 mmol and sodium hypophosphite of 0.845 mmol were dissolved into ethylene glycol of 200 ml and added to an ethylene glycol solution of 200 ml that contains dispersed acetylene black (AB) with a specific surface area of 68 m²/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the acetylene black. After the reaction ends, filtration, washing, and drying were performed, thereby producing catalyst.

EXAMPLE 26

Bis(acetylacetonato)platinum(II) of 1.69 mmol and sodium hypophosphite of 0.845 mmol were dissolved into ethylene glycol of 200 ml and added to an ethylene glycol solution of 200 ml that contains dispersed carbon black (CB) with a specific surface area of 140 m²/g of 0.5 g as a porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the carbon black. After the reaction ends, filtration, washing, and drying were performed, thereby producing catalyst.

EXAMPLE 27

Bis(acetylacetonato)platinum(II) of 1.69 mmol and sodium phosphite of 0.845 mmol were dissolved into ethylene glycol of 200 ml and added to an ethylene glycol solution of 130 ml that contains dispersed multiwalled carbon nanotube (MWCNT) with a specific surface area of 30 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the multiwalled carbon nanotube. After the reaction ends, filtration, washing, and drying were performed, thereby producing catalyst.

EXAMPLE 28

Bis(acetylacetonato)platinum(II) of 1.69 mmol and sodium phosphite of 0.845 mmol were dissolved into ethylene glycol of 200 ml and added to an ethylene glycol solution of 130 ml that contains dispersed acetylene black (AB) with a specific surface area of 68 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the acetylene black. After the reaction ends, filtration, washing, and drying were performed, thereby producing catalyst.

EXAMPLE 29

Bis(acetylacetonato)platinum(II) of 1.69 mmol and sodium phosphite of 0.845 mmol were dissolved into ethylene glycol of 200 ml and added to an ethylene glycol solution of 130 ml that contains dispersed carbon black (CB) with a specific surface area of 140 m$^2$/g of 0.5 g as a porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the carbon black. After the reaction ends, filtration, washing, and drying were performed, thereby producing catalyst.

EXAMPLE 30

Multiwalled carbon nanotube (MWCNT), which is a non-porous support, with a specific surface area of 30 m$^2$/g of 0.5 g was dispersed into pure water. Platinic hexachloride of hexahydrate of 1.69 mmol and sodium hypophosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the multiwalled carbon nanotube. After the reaction ends, filtration, washing, and drying were performed, thereby producing catalyst.

EXAMPLE 31

Acetylene black (AB), which is a non-porous support, with a specific surface area of 68 m$^2$/g of 0.5 g was dispersed into pure water. Platinic hexachloride of hexahydrate of 1.69 mmol and sodium hypophosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the acetylene black. After the reaction ends, filtration, washing, and drying were performed, thereby producing catalyst.

EXAMPLE 32

Carbon black (CB), which is a porous support, with a specific surface area of 140 m$^2$/g of 0.5 g was dispersed into pure water. Platinic hexachloride of hexahydrate of 1.69 mmol and sodium hypophosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the carbon black. After the reaction ends, filtration, washing, and drying were performed, thereby producing catalyst.

EXAMPLE 33

Multiwalled carbon nanotube (MWCNT), which is a non-porous support, with a specific surface area of 30 m$^2$/g of 0.5 g was dispersed into pure water. Platinic hexachloride of hexahydrate of 1.69 mmol and sodium phosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the multiwalled carbon nanotube. After the reaction ends, filtration, washing, and drying were performed, thereby producing catalyst.

EXAMPLE 34

Acetylene black (AB), which is a non-porous support, with a specific surface area of 68 m$^2$/g of 0.5 g was dispersed into pure water. Platinic hexachloride of hexahydrate of 1.69 mmol and sodium phosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the acetylene black. After the reaction ends, filtration, washing, and drying were performed, thereby producing catalyst.

EXAMPLE 35

Carbon black (CB), which is a porous support, with a specific surface area of 140 m$^2$/g of 0.5 g was dispersed into pure water. Platinic hexachloride of hexahydrate of 1.69 mmol and sodium phosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the carbon black. After the reaction ends, filtration, washing, and drying were performed, thereby producing catalyst.

EXAMPLE 36

Multiwalled carbon nanotube (MWCNT), which is a non-porous support, with a specific surface area of 30 $m^2$/g of 0.5 g was dispersed into pure water. Platinic hexachloride of hexahydrate of 1.69 mmol and sodium hypophosphite of 0.845 mmol were dissolved into pure water of 500 ml and added. Sodium hydroxide solution was dropped, and the pH value of the solution was adjusted to 10 by using a pH meter. In the air, ultrasonic wave was applied to the solution for 2 hours by using a commercially available ultrasonic cleaner so as to deposit PtP catalyst on the multiwalled carbon nanotube. After the reaction ends, filtration, washing, and drying were performed, thereby producing catalyst.

EXAMPLE 37

Acetylene black (AB), which is a non-porous support, with a specific surface area of 68 $m^2$/g of 0.5 g was dispersed into pure water. Platinic hexachloride of hexahydrate of 1.69 mmol and sodium hypophosphite of 0.845 mmol were dissolved into pure water of 500 ml and added. Sodium hydroxide solution was dropped, and the pH value of the solution was adjusted to 10 by using a pH meter. In the air, ultrasonic wave was applied to the solution for 2 hours by using a commercially available ultrasonic cleaner so as to deposit PtP catalyst on the acetylene black. After the reaction ends, filtration, washing, and drying were performed, thereby producing catalyst.

EXAMPLE 38

Carbon black (CB), which is a porous support, with a specific surface area of 140 $m^2$/g of 0.5 g was dispersed into pure water. Platinic hexachloride of hexahydrate of 1.69 mmol and sodium hypophosphite of 0.845 mmol were dissolved into pure water of 500 ml and added. Sodium hydroxide solution was dropped, and the pH value of the solution was adjusted to 10 by using a pH meter. In the air, ultrasonic wave is applied to the solution for 2 hours by using a commercially available ultrasonic cleaner so as to deposit PtP catalyst on the carbon black. After the reaction ends, filtration, washing, and drying were performed, thereby producing catalyst.

EXAMPLE 39

Multiwalled carbon nanotube (MWCNT), which is a non-porous support, with a specific surface area of 30 $m^2$/g of 0.5 g was dispersed into pure water. Platinic hexachloride of hexahydrate of 1.69 mmol and sodium phosphite of 0.845 mmol were dissolved into pure water of 500 ml and added. Sodium hydroxide solution was dropped, and the pH value of the solution was adjusted to 10 using a pH meter. In the air, ultrasonic wave was applied to the solution for 2 hours by using a commercially available ultrasonic cleaner so as to deposit PtP catalyst on the multiwalled carbon nanotube. After the reaction ends, filtration, washing, and drying were performed, thereby producing catalyst.

EXAMPLE 40

Acetylene black (AB), which is a non-porous support, with a specific surface area of 68 $m^2$/g of 0.5 g was dispersed into pure water. Platinic hexachloride of hexahydrate of 1.69 mmol and sodium phosphite of 0.845 mmol were dissolved into pure water of 500 ml and added. Sodium hydroxide solution was dropped, and the pH value of the solution was adjusted to 10 using a pH meter. In the air, ultrasonic wave was applied to the solution for 2 hours by using a commercially available ultrasonic cleaner so as to deposit PtP catalyst on the acetylene black. After the reaction ends, filtration, washing, and drying were performed, thereby producing catalyst.

EXAMPLE 41

Carbon black (CB), which is a porous support, with a specific surface area of 140 $m^2$/g of 0.5 g was dispersed into pure water. Platinic hexachloride of hexahydrate of 1.69 mmol and sodium phosphite of 0.845 mmol were dissolved into pure water of 500 ml and added. Sodium hydroxide solution was dropped, and the pH value of the solution was adjusted to 10 using a pH meter. In the air, ultrasonic wave is applied to the solution for 2 hours by using a commercially available ultrasonic cleaner so as to deposit PtP catalyst on the carbon black. After the reaction ends, filtration, washing, and drying were performed, thereby producing catalyst.

EXAMPLE 42

Platinic hexachloride of hexahydrate of 1.69 mmol and sodium hypophosphite of 0.845 mmol were dissolved into ethylene glycol solution of 200 ml (ethylene glycol:water=50 vol. %:50 vol. %) and added to an ethylene glycol solution of 200 ml (ethylene glycol:water=50 vol. % 50 vol. %) that contains dispersed multiwalled carbon nanotube (MWCNT) with a specific surface area of 30 $m^2$/g of 0.5 g as a non-porous support. A NaOH solution was dropped, and the pH value of the solution was adjusted to 10 by using a pH litmus paper. In a nitrogen gas atmosphere, the solution was stirred and refluxed for 4 hours at 130° C. so as to deposit PtP catalyst on the multiwalled carbon nanotube. After the reaction ends, filtration, washing, and drying were performed, thereby producing catalyst.

EXAMPLE 43

Platinic hexachloride of hexahydrate of 1.69 mmol and sodium hypophosphite of 0.845 mmol were dissolved into ethanol solution of 200 ml (ethanol:water=50 vol. %:50 vol. %) and added to an ethanol solution of 200 ml (ethanol:water=50 vol. %:50 vol. %) that contains dispersed multiwalled carbon nanotube (MWCNT) with a specific surface area of 30 $m^2$/g of 0.5 g as a non-porous support. A NaOH solution was dropped, and the pH value of the solution was adjusted to 10 by using a pH litmus paper. In a nitrogen gas atmosphere, the solution was stirred and refluxed for 4 hours at 95° C. so as to deposit PtP catalyst on the multiwalled carbon nanotube. After the reaction ends, filtration, washing, and drying were performed, thereby producing catalyst.

COMPARATIVE EXAMPLE 16

Bis(acetylacetonato)platinum(II) of 1.69 mmol was dissolved into ethylene glycol of 200 ml and added to an ethylene glycol solution of 200 ml that contains dispersed multiwalled carbon nanotube (MWCNT) with a specific surface area of 30 $m^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit Pt catalyst on the multiwalled carbon nanotube. After the reaction ends, filtration, washing, and drying were performed, thereby producing catalyst.

COMPARATIVE EXAMPLE 17

Bis(acetylacetonato)platinum(II) of 1.69 mmol was dissolved into ethylene glycol of 200 ml and added to an ethylene glycol solution of 200 ml that contains dispersed acetylene black (AB) with a specific surface area of 68 $m^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit Pt catalyst on the acetylene black. After the reaction ends, filtration, washing, and drying were performed, thereby producing catalyst.

COMPARATIVE EXAMPLE 18

Bis(acetylacetonato)platinum(II) of 1.69 mmol was dissolved into ethylene glycol of 200 ml and added to an ethylene glycol solution of 200 ml that contains dispersed carbon black (CB) with a specific surface area of 140 $m^2$/g of 0.5 g as a porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit Pt catalyst on the carbon black. After the reaction ends, filtration, washing, and drying were performed, thereby producing catalyst.

The composition of each catalyst produced in Examples 24 to 43 and Comparative Examples 16 to 18 is observed by X-ray photoelectron spectroscopy analysis (XPS). Further, the particle diameter of the catalyst is observed by transmission electron microscope (TEM). Table 16 shows the results. In examples 24 to 43, sodium hypophosphite or sodium phosphate is added in a synthetic system and therefore P is added to the Pt catalyst. The particle diameter of the PtP catalyst produced in Examples 24 to 41 decreases to 2 nm. Addition of P has the effect of reducing the particle diameter of Pt catalyst to 2 nm even in the case a non-porous carbon support with a small specific surface area is used. Use of the non-porous carbon support with a small specific surface area allows all catalyst to be deposited on the surface of the support, thus improving catalyst utilization efficiency. Thus, adding P reduces the catalyst particle diameter to 2 nm to keep high catalyst activity even when a non-porous carbon support with a small specific surface area is used. The PtP catalyst is therefore an extremely useful catalyst material that can achieve high catalyst activity and high catalyst utilization efficiency at the same time. Example 42 uses an ethylene glycol aqueous solution as alcohol and synthesizes PtP catalyst by lowering a reflux temperature from 200° C. to 130° C. The growth of a particle is suppressed by lowering the synthesis temperature. Thus, the PtP catalyst with a particle diameter of 1.8 nm is obtained by lowering the synthesis temperature to 130° C. Similarly, Example 43 uses an ethanol aqueous solution and synthesizes PtP catalyst at a reflux temperature of 95° C. As a result, the PtP catalyst with a particle diameter of 1.5 nm is obtained. On the other hand, since Comparative Examples 16 to 18 do not add P, the particle diameter of Pt catalyst is as large as 6 to 10 nm. Though the particle diameter of Pt catalyst decreases as a specific surface area of a carbon support increases, it is still as high as up to 6 nm even with a use of CB with a specific surface area of 140 $m^2$/g.

TABLE 16

| Catalyst | Carbon support | Support specific surface area ($m^2$/g) | Catalyst particle diameter by TEM | Catalyst composition (at. %) |
|---|---|---|---|---|
| Example 24 | MWCNT | 30 | 2 nm | $Pt_{86}P_{14}$ |
| Example 25 | AB | 68 | 2 nm | $Pt_{86}P_{14}$ |
| Example 26 | CB | 140 | 2 nm | $Pt_{86}P_{14}$ |
| Example 27 | MWCNT | 30 | 2 nm | $Pt_{87}P_{13}$ |
| Example 28 | AB | 68 | 2 nm | $Pt_{87}P_{13}$ |
| Example 29 | CB | 140 | 2 nm | $Pt_{87}P_{13}$ |
| Example 30 | MWCNT | 30 | 2 nm | $Pt_{88}P_{12}$ |
| Example 31 | AB | 68 | 2 nm | $Pt_{88}P_{12}$ |
| Example 32 | CB | 140 | 2 nm | $Pt_{88}P_{12}$ |
| Example 33 | MWCNT | 30 | 2 nm | $Pt_{89}P_{11}$ |
| Example 34 | AB | 68 | 2 nm | $Pt_{89}P_{11}$ |
| Example 35 | CB | 140 | 2 nm | $Pt_{89}P_{11}$ |
| Example 36 | MWCNT | 30 | 2 nm | $Pt_{86}P_{14}$ |
| Example 37 | AB | 68 | 2 nm | $Pt_{86}P_{14}$ |
| Example 38 | CB | 140 | 2 nm | $Pt_{86}P_{14}$ |
| Example 39 | MWCNT | 30 | 2 nm | $Pt_{85}P_{15}$ |
| Example 40 | AB | 68 | 2 nm | $Pt_{85}P_{15}$ |
| Example 41 | CB | 140 | 2 nm | $Pt_{85}P_{15}$ |
| Example 42 | MWCNT | 30 | 1.8 nm | $Pt_{86}P_{14}$ |
| Example 43 | MWCNT | 30 | 1.5 nm | $Pt_{86}P_{14}$ |
| Comparative example 16 | MWCNT | 30 | to 10 nm | $Pt_{100}$ |
| Comparative example 17 | AB | 68 | to 8 nm | $Pt_{100}$ |
| Comparative example 18 | CB | 140 | to 6 nm | $Pt_{100}$ |

Figure 7A:
FIG. 7A shows a transmission electron microscope image of PtP catalyst with a multiwalled carbon nanotube support.
Figure 7B:
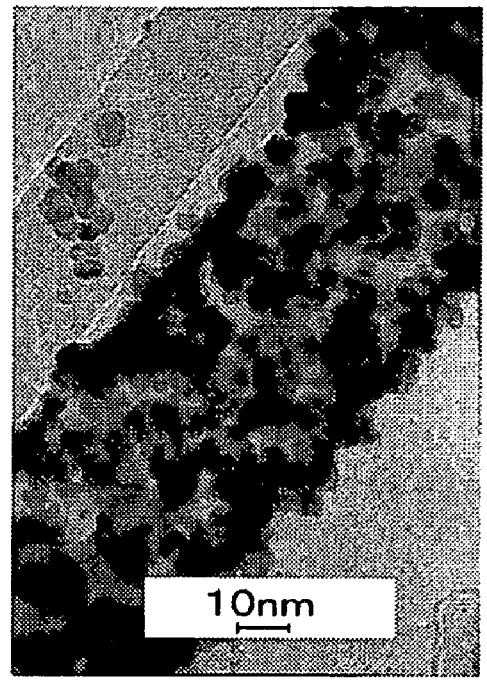
FIG. 7B shows a transmission electron microscope image of Pt catalyst with a multiwalled carbon nanotube support.

FIG. 7A shows a transmission electron microscope image of PtP catalyst with a multiwalled carbon nanotube support that is obtained by Example 24, and FIG. 7B shows that of Pt catalyst with a multiwalled carbon nanotube support that is obtained by Comparative Example 24. As shown in the images, the PtP catalyst of this invention has a particle diameter of 2 nm and catalyst particles are dispersed sufficiently. On the other hand, the Pt catalyst of Comparative Example 24 that does not contain P has a particle diameter of as large as up to 10 nm and catalyst particles are agglutinated and not dispersed sufficiently. These results show the effects of reducing particle sizes and dispersing particles of the Pt catalyst by addition of P.

EXAMPLE 44

An alcohol solution of pure water and Nafion®, available from E.I. DuPont de Namours and Company, was added to the PtP catalyst with a carbon support that is obtained in Examples 24 to 43 and stirred, and then its viscosity was adjusted to create a catalyst ink. The catalyst ink was then applied onto Teflon® sheet, available also from DuPont, in such a way that the application amount of the PtP catalyst was 5 mg/$cm^2$. After dried, the Teflon® sheet was peeled off, thereby creating an oxygen electrode catalyst. Further, an alcohol solution of pure water and Nafion® was added to the PtRuP catalyst with a particle diameter of 2 nm supported on acetylene black (AB) with a specific surface area of 68 $m^2$/g, which is a non-porous carbon support, and stirred, and then its viscosity was adjusted to create a catalyst ink. The catalyst ink was then applied onto Teflon® sheet in such a way that the amount of the Pt catalyst was 5 mg/$cm^2$. After dried, the Teflon® sheet was peeled off, thereby creating a methanol electrode catalyst. Then, the PtP oxygen electrode catalyst and the PtRuP methanol electrode catalyst were hot pressed to both sides of a polymer electrolyte membrane (Nafion® membrane 112, available from DuPont), thereby producing a membrane electrode assembly. Using the membrane electrode assembly and a methanol solution of 15 wt % as a liquid fuel, a direct methanol fuel cell shown in FIG. 4 was produced. The direct methanol fuel cell 10 of FIG. 4 includes an oxygen electrode side charge collector 12, an oxygen electrode side diffusion layer 14, a polymer electrolyte membrane 16, a methanol electrode side diffusion layer 18, a methanol electrode side charge collector 20, a methanol fuel tank 22, an air intake opening 24, an oxygen electrode PtP catalyst layer 26, a methanol electrode PtRuP catalyst layer 28, and a methanol fuel intake opening 30. The oxygen electrode side charge collector 12 serves as a structure to take in the air (oxygen) through the air intake opening 24 and also as a power collector. The polymer electrolyte membrane 16 (Nafion® membrane 112, available from DuPont) serves as a carrier that carries proton generated in the methanol electrode to the oxygen electrode and also as a separator that prevents the short-circuit of the methanol electrode and the oxygen electrode. In the direct methanol fuel cell 10 having this configuration, liquid fuel supplied from the methanol electrode side charge collector 20 passes through the methanol electrode side diffusion layer 18 and enters the methanol electrode catalyst layer 28 where it is oxidized into $CO_2$, electron, and proton. The proton passes through the polymer electrolyte membrane 16 and moves to the oxygen electrode side. In the oxygen electrode, the oxygen entering from the oxygen electrode side charge collector 12 is reduced by the electron generated in the methanol electrode, and this oxygen and the proton react to generate water. The direct methanol fuel cell 10 of FIG. 4 generates electric power by the methanol oxidation reaction and the oxygen reduction reaction.

EXAMPLE 45

The example 45 produced a direct methanol fuel cell in the same manner as Example 44 except for using the Pt catalyst of Comparative Examples 16 to 18 instead of the PtP catalyst in Example 44 as oxygen electrode catalyst.

The power density of each direct methanol fuel cell obtained in Example 44 and 45 was measured. Table 17 shows the measurement results. Since Example 44 used PtP catalyst, a catalyst particle diameter was 2 nm or less. Further, it used a non-porous carbon support or a carbon support that is a porous support with a relatively smaller number of fine pores as a catalyst support. Therefore, catalyst utilization efficiency increased as catalyst activity increased, and the power density was as high as 90 mW/cm² or higher. In Table 17, the power density was highest with carbon support of MWCNT, second highest with AB and lowest with CB. The CB produced the lowest power density because CB is a porous support and part of PtP catalyst was buried in the fine pores and unable to contribute to oxygen reduction reaction. Since AB is a non-porous support, it produced a higher power density than the CB support. MWCNT had a large number of physical voids in the electrode catalyst layer because of being non-porous and its shape. This enhanced diffusion of oxygen gas that served as fuel and water that was generated at cathode. Further, since MWCNT had a lower specific resistance than CB, it is possible to reduce IR loss and suppress a decrease in cell voltage, thereby producing high power density. Furthermore, Example 42 synthesized PtP catalyst by lowering a reflux temperature from 200° C. to 130° C., and Example 43 synthesized PtP catalyst by lowering a reflux temperature to 95° C. The reduction in synthesis temperature suppressed growth of catalyst particles, and the particle diameters of PtP catalyst were reduced to 1.8 nm and 1.5 nm, respectively. The decrease in particle diameter increased the specific surface area of catalyst to enhance catalyst activity, and the power density was thereby as high as 110 mW/cm² or higher. On the other hand, as shown in Example 45, when using a non-porous MWCNT as a support, the particle diameter of Pt catalyst, which does not contain P, was as large as up to 10 nm, and the power density was 70 mW/cm². Even when CB with a large specific surface area was used as a support, the particle diameter was still as large as up to 6 nm and the power density increased by only about 5 mW/cm².

TABLE 17

| Catalyst | Carbon support | Support specific surface area ($m^2/g$) | Catalyst particle diameter (nm) | Catalyst composition (at. %) | Power density (mW/cm²) |
|---|---|---|---|---|---|
| Example 24 | MWCNT | 30 | 2 | $Pt_{86}P_{14}$ | 100 |
| Example 25 | AB | 68 | 2 | $Pt_{86}P_{14}$ | 95 |
| Example 26 | CB | 140 | 2 | $Pt_{86}P_{14}$ | 90 |
| Example 27 | MWCNT | 30 | 2 | $Pt_{87}P_{13}$ | 101 |
| Example 28 | AB | 68 | 2 | $Pt_{87}P_{13}$ | 95 |
| Example 29 | CB | 140 | 2 | $Pt_{87}P_{13}$ | 90 |
| Example 30 | MWCNT | 30 | 2 | $Pt_{88}P_{12}$ | 102 |
| Example 31 | AB | 68 | 2 | $Pt_{88}P_{12}$ | 96 |
| Example 32 | CB | 140 | 2 | $Pt_{88}P_{12}$ | 90 |
| Example 33 | MWCNT | 30 | 2 | $Pt_{89}P_{11}$ | 101 |
| Example 34 | AB | 68 | 2 | $Pt_{89}P_{11}$ | 96 |
| Example 35 | CB | 140 | 2 | $Pt_{89}P_{11}$ | 90 |
| Example 36 | MWCNT | 30 | 2 | $Pt_{86}P_{14}$ | 101 |
| Example 37 | AB | 68 | 2 | $Pt_{86}P_{14}$ | 94 |
| Example 38 | CB | 140 | 2 | $Pt_{86}P_{14}$ | 90 |
| Example 39 | MWCNT | 30 | 2 | $Pt_{85}P_{15}$ | 100 |
| Example 40 | AB | 68 | 2 | $Pt_{85}P_{15}$ | 95 |
| Example 41 | CB | 140 | 2 | $Pt_{85}P_{15}$ | 90 |
| Example 42 | MWCNT | 30 | 1.8 | $Pt_{86}P_{14}$ | 110 |
| Example 43 | MWCNT | 30 | 1.5 | $Pt_{86}P_{14}$ | 120 |
| Comparative example 16 | MWCNT | 30 | to 10 | $Pt_{100}$ | 70 |
| Comparative example 17 | AB | 68 | to 8 | $Pt_{100}$ | 73 |
| Comparative example 18 | CB | 140 | to 6 | $Pt_{100}$ | 75 |

EXAMPLE 46

An alcohol solution of pure water and Nafion®, available from E.I. DuPont de Namours and Company, was added to the PtP catalyst with a carbon support that is obtained in Examples 24 to 43 and stirred, and then its viscosity was adjusted to create a catalyst ink. The catalyst ink was then applied onto Teflon® sheet, available also from DuPont, in such a way that the application amount of the PtP catalyst was 0.5 mg/cm². After dried, the Teflon® sheet was peeled off, thereby creating an oxygen electrode catalyst. Further, an alcohol solution of Nafion® and PtRuP catalyst with a particle diameter of 2 nm supported on acetylene black (AB) with a specific surface area of 68 m²/g, which is a non-porous carbon support were added and stirred, and then its viscosity was adjusted to create a catalyst ink. The catalyst ink was then applied onto Teflon® sheet in such a way that the amount of the PtRuP catalyst was 0.5 mg/cm². After dried, the Teflon® sheet was peeled off, thereby creating a hydrogen electrode catalyst. Then, the PtP oxygen electrode catalyst and the PtRuP hydrogen electrode catalyst were hot pressed to both sides of a polymer electrolyte membrane (Nafion® membrane 112, available from DuPont), thereby producing a membrane electrode assembly. Using the membrane electrode assembly and hydrogen gas as fuel, a polymer electrolyte fuel cell shown in FIG. 5 was produced. The polymer electrolyte fuel cell 40 of FIG. 5 includes an oxygen electrode side charge collector 44, an oxygen electrode side diffusion layer 43, a polymer electrolyte membrane 41, a hydrogen electrode side diffusion layer 48, a hydrogen electrode side charge collector 47, an air intake opening 42, an oxygen electrode PtP catalyst layer 45, a hydrogen electrode PtRuP catalyst layer 46, and a hydrogen fuel intake opening 49. The oxygen electrode side charge collector 44 serves as a structure to take in the air (oxygen) through the air intake opening 42 and also as a power collector. The polymer electrolyte membrane 41 (Nafion® membrane 112, available from DuPont) serves as a carrier that carries proton generated in the hydrogen electrode to the oxygen electrode and also as a separator that prevents the short-circuit of the hydrogen electrode and the oxygen electrode. In the polymer electrolyte fuel cell 40 having this configuration, the hydrogen gas supplied from the hydrogen electrode side charge collector 47 passes through the hydrogen electrode side diffusion layer 48 and enters the hydrogen electrode catalyst layer 46 where it is oxidized into electron and proton. The proton passes through the polymer electrolyte membrane 41 and moves to the oxygen electrode side. In the oxygen electrode, the oxygen entering from the oxygen electrode side charge collector 44 is reduced by the electron generated in the hydrogen electrode, and this oxygen and the proton react to generate water. The polymer electrolyte fuel cell 40 of FIG. 5 generates electric power by the hydrogen oxidation reaction and the oxygen reduction reaction.

EXAMPLE 47

The example 47 produced a polymer electrolyte fuel cell in the same manner as Example 46 except for using the Pt catalyst produced in Comparative Examples 16 to 18 instead of the PtP catalyst with a carbon support in Example 46 as oxygen electrode catalyst.

The power density of each polymer electrolyte fuel cell obtained in Example 46 and 47 was measured. Table 18 shows the measurement results. Since Example 46 used PtP catalyst, a catalyst particle diameter was 2 nm or less. Further, it used a non-porous carbon support or a carbon support that is a porous support with a relatively smaller number of fine pores as a catalyst support. Therefore, catalyst use efficiency increased as catalyst activity increased, and the power density was as high as 220 mW/cm$^2$ or higher. In Table 18, the power density was highest with carbon support of MWCNT, second highest with AB and lowest with CB. The CB produced the lowest power density because CB is a porous support and part of PtP catalyst was buried in the fine pores and unable to contribute to oxygen reduction reaction. Since AB is a non-porous support, it produced a higher power density than the CB support. MWCNT had a large number of physical voids in the electrode catalyst layer because of being non-porous and its shape. This enhanced dispersion of oxygen gas that served as fuel and water that was generated at cathode. Further, since MWCNT had a lower specific resistance than CB, it is possible to reduce IR loss and suppress a decrease in cell voltage, thereby producing high power density. Furthermore, Example 42 synthesized PtP catalyst by lowering a reflux temperature from 200° C. to 130° C., and Example 43 synthesized PtP catalyst by lowering a reflux temperature to 95° C. The reduction in synthesis temperature suppressed growth of catalyst particles, and the particle diameters of PtP catalyst were reduced to 1.8 nm and 1.5 nm, respectively. The decrease in particle diameter increased the specific surface area of catalyst to enhance catalyst activity, and the power density was thereby as high as 240 mW/cm$^2$ or higher. On the other hand, as shown in Example 47, when using a non-porous MWCNT as a support, the particle diameter of Pt catalyst, which does not contain P, was as large as up to 10 nm, and the power density was 180 mW/cm$^2$ Even when CB with a large specific surface area was used as a support, the particle diameter was still as large as up to 6 nm and the power density increased by only about 10 mW/cm$^2$.

TABLE 18

| Catalyst | Carbon support | Support specific surface area (m$^2$/g) | Catalyst particle diameter (nm) | Catalyst composition (at. %) | Power density (mW/cm$^2$) |
|---|---|---|---|---|---|
| Example 24 | MWCNT | 30 | 2 | $Pt_{86}P_{14}$ | 230 |
| Example 25 | AB | 68 | 2 | $Pt_{86}P_{14}$ | 225 |
| Example 26 | CB | 140 | 2 | $Pt_{86}P_{14}$ | 220 |
| Example 27 | MWCNT | 30 | 2 | $Pt_{87}P_{13}$ | 230 |
| Example 28 | AB | 68 | 2 | $Pt_{87}P_{13}$ | 226 |
| Example 29 | CB | 140 | 2 | $Pt_{87}P_{13}$ | 220 |
| Example 30 | MWCNT | 30 | 2 | $Pt_{88}P_{12}$ | 231 |
| Example 31 | AB | 68 | 2 | $Pt_{88}P_{12}$ | 225 |
| Example 32 | CB | 140 | 2 | $Pt_{88}P_{12}$ | 220 |
| Example 33 | MWCNT | 30 | 2 | $Pt_{89}P_{11}$ | 231 |
| Example 34 | AB | 68 | 2 | $Pt_{89}P_{11}$ | 226 |
| Example 35 | CB | 140 | 2 | $Pt_{89}P_{11}$ | 220 |
| Example 36 | MWCNT | 30 | 2 | $Pt_{86}P_{14}$ | 232 |
| Example 37 | AB | 68 | 2 | $Pt_{86}P_{14}$ | 227 |
| Example 38 | CB | 140 | 2 | $Pt_{86}P_{14}$ | 220 |
| Example 39 | MWCNT | 30 | 2 | $Pt_{85}P_{15}$ | 230 |
| Example 40 | AR | 68 | 2 | $Pt_{85}P_{15}$ | 225 |
| Example 41 | CB | 140 | 2 | $Pt_{85}P_{15}$ | 220 |
| Example 42 | MWCNT | 30 | 1.8 | $Pt_{86}P_{14}$ | 240 |
| Example 43 | MWCNT | 30 | 1.5 | $Pt_{86}P_{14}$ | 250 |
| Comparative example 16 | MWCNT | 30 | to 10 | $Pt_{100}$ | 180 |
| Comparative example 17 | AB | 68 | to 8 | $Pt_{100}$ | 185 |
| Comparative example 18 | CB | 140 | to 6 | $Pt_{100}$ | 190 |

EXAMPLE 48

Bis(acetylacetonato)platinum(II) of 1.69 mmol was dissolved into ethylene glycol of 100 ml and mixed together. Sodium hypophosphite of 0 to 200 mol % of the number of Pt moles was then dissolved into ethylene glycol solution of 100 ml and added to the above solution. Further, ethylene glycol solution of 200 ml where multiwalled carbon nanotube (MWCNT) with a specific surface area of 30 m$^2$/g, which is a non-porous support, of 0.5 g was dispersed was added thereto. A sulfuric acid solution was dropped into this solution, and the pH value was adjusted to 3 by using a pH litmus paper. In a nitrogen gas atmosphere, the solution was stirred and refluxed in an oil bath at 200° C. for 4 hours, thereby depositing PtP catalyst on the multiwalled carbon nanotube. After the reaction ended, filtration, washing, and drying were performed, thereby producing catalyst.

X-ray diffraction analysis was performed on the PtP catalyst obtained in Example 48, and the particle diameter of the PtP catalyst was estimated by applying the Scherrer's formula to the diffraction peak of (220). Then, the composition of the catalyst was observed by XPS. Further, a direct methanol fuel cell was produced with the PtP catalyst in the similar manner as Example 44 and the power density of each cell was measured. Table 19 shows the results. It shows that if the content of P is 2at. % or higher, the particle diameter of the PtP catalyst is reduced to less than 3 nm and achieves high power density. On the other hand, if the content of P exceeds 50at. %, the content of Pt decreases to reduce the power density.

TABLE 19

| Amount of sodium hypophosphite added | Catalyst particle diameter (nm) | Catalyst composition (at. %) | Power density (mW/cm$^2$) |
|---|---|---|---|
| 0 mol % | to 10 | $Pt_{100}$ | 70 |
| 5 mol % | 2.4 | $Pt_{97}P_3$ | 85 |
| 10 mol % | 2.2 | $Pt_{95}P_5$ | 88 |
| 20 mol % | 2.1 | $Pt_{81}P_9$ | 94 |
| 50 mol % | 2.0 | $Pt_{86}P_{14}$ | 100 |
| 100 mol % | 2.0 | $Pt_{78}P_{22}$ | 110 |
| 150 mol % | 1.8 | $Pt_{72}P_{28}$ | 103 |
| 200 mol % | 1.6 | $Pt_{47}P_{53}$ | 70 |

The catalyst composed of PtP may be used as oxygen electrode catalyst of a direct methanol fuel cell (DMFC) and a polymer electrolyte fuel cell (PEFC). It may be also used as an oxygen electrode catalyst layer in a membrane electrode assembly for these fuel cells. The PtP catalyst of the present invention has hydrogen oxidation activity and it may be used as hydrogen electrode catalyst of a polymer electrolyte fuel cell that uses pure hydrogen with no CO poisoning as fuel.

Though the catalyst for fuel cell composed of Pt—Ru—P particulates deposited on a carbon support of this invention is particularly suitable for use in direct methanol fuel cells, it may be used also as a catalyst of polymer electrolyte fuel cells.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A heterogeneous catalyst composed of particles where at least a Pt particle is in contact with P particles on a surface of said Pt particle and a nonporous carbon support.

2. The heterogeneous catalyst according to claim 1, wherein said Pt particles having a diameter from 1 to 3 nm.

3. The heterogeneous catalyst according to claim 1, wherein said Pt particles comprise at least 2 atom % P.

4. The heterogeneous catalyst according to claim 1, wherein the content of P is 2 atom % to 50 atom %.

5. The heterogeneous catalyst according to claim 1, wherein the nonporous carbon support is at least one selected from the group consisting of carbon black and carbon nanotube.

6. The heterogeneous catalyst according to claim 5, wherein the carbon support is a multi-walled carbon nanotube.

7. The heterogeneous catalyst according to claim 1, wherein each particle comprise Pt, Ru and P.

8. The heterogeneous catalyst according to claim 7, wherein the ratio of Pt and Ru in the particles is $Pt_{40}Ru_{60}$ to $Pt_{90}Ru_{10}$.

9. The heterogeneous catalyst according to claim 7, wherein the content of P is 3 atom % to 27 atom % of the total moles of Pt—Ru.

10. A fuel cell comprising:
a cathode, an anode and a polymer electrolyte membrane placed between the cathode and anode, wherein said anode comprise said catalyst according to claim 7.

11. A process for preparing the catalyst according to claim 8, comprising:
a step for reducing Pt ions in the presence of reducing agent comprising phosphorus.

12. A membrane electrode assembly, comprising:
an anode catalyst layer, a cathode catalyst layer and a polymer electrolyte membrane placed between the anode catalyst layer and the cathode catalyst layer wherein said anode catalyst layer comprise said catalyst according to claim 7.

13. The heterogeneous catalyst according to claim 1, further comprising a carbon support having a specific surface area in a range of 20 m$^2$/g to 300 m$^2$/g.

14. A fuel cell comprising:
a cathode, an anode and a polymer electrolyte membrane placed between the cathode and anode, wherein said cathode and/or anode comprise said catalyst according to claim 1.

15. The method of producing a voltage with the fuel cell according to claim 14 comprising:
feeding methanol and water, or hydrogen to the anode and feeding oxygen to the cathode.

16. A fuel cell comprising:
a cathode, an anode and a polymer electrolyte membrane placed between the cathode and anode, wherein said cathode comprise said catalyst according to claim 1.

17. A fuel cell comprising:
a cathode, an anode and a polymer electrolyte membrane placed between the cathode and anode, wherein said cathode comprise said catalyst according to claim 1, and said anode comprise said catalyst according to claim 7.

18. A process for preparing the catalyst according to claim 1, comprising:
a step for reducing Pt ions in the presence of reducing agent comprising phosphorus.

19. The process according to claim 18, wherein the compound derives from one of phosphinic acid or phosphonic acid.

20. The process according to claim 18, wherein the reducing step is an alcohol reduction or electroless plating step.

21. A membrane electrode assembly, comprising:
an anode catalyst layer, a cathode catalyst layer and a polymer electrolyte membrane placed between the anode catalyst layer and the cathode catalyst layer wherein said anode catalyst layer and/or cathode catalyst layer comprise said catalyst according to claim 1.

22. A membrane electrode assembly, comprising:
an anode catalyst layer, a cathode catalyst layer and a polymer electrolyte membrane placed between the anode catalyst layer and the cathode catalyst layer wherein said cathode catalyst layer comprise said catalyst according to claim 1.

* * * * *